United States Patent
Saidi et al.

(10) Patent No.: US 7,106,738 B2
(45) Date of Patent: Sep. 12, 2006

(54) METHOD AND APPARATUS FOR HIGH SPEED PACKET SWITCHING USING TRAIN PACKET QUEUING AND PROVIDING HIGH SCALABILITY

(75) Inventors: Hossein Saidi, Lake Oswego, OR (US); Chunhua Hu, St. Louis, MO (US); Peter Yifey Yan, St. Louis, MO (US); Paul Seungkyu Min, Clayton, MO (US)

(73) Assignee: Erlang Technologies, Inc., Webster Groves, MO (US)

( * ) Notice: Subject to any disclaimer, the term of this patent is extended or adjusted under 35 U.S.C. 154(b) by 799 days.

(21) Appl. No.: 09/828,703

(22) Filed: Apr. 6, 2001

(65) Prior Publication Data

US 2002/0145974 A1   Oct. 10, 2002

(51) Int. Cl.
*H04L 12/28* (2006.01)
*H04L 12/56* (2006.01)

(52) U.S. Cl. .................. 370/392; 370/395.71
(58) Field of Classification Search ...................... None
See application file for complete search history.

(56) References Cited

U.S. PATENT DOCUMENTS

| | | | |
|---|---|---|---|
| 5,191,578 A * | 3/1993 | Lee | 370/418 |
| 5,199,028 A * | 3/1993 | Arnold | 370/418 |
| 5,440,550 A | 8/1995 | Follett | |
| 5,526,352 A | 6/1996 | Min et al. | |
| 5,754,768 A * | 5/1998 | Brech et al. | 709/230 |
| 5,838,679 A | 11/1998 | Kim et al. | |
| 5,892,924 A * | 4/1999 | Lyon et al. | 709/245 |
| 6,269,464 B1 * | 7/2001 | Boussina et al. | 714/752 |
| 6,298,070 B1 * | 10/2001 | Carlson et al. | 370/465 |
| 6,389,038 B1 * | 5/2002 | Goldberg et al. | 370/471 |

* cited by examiner

*Primary Examiner*—Chau Nguyen
*Assistant Examiner*—Cynthia L Davis
(74) *Attorney, Agent, or Firm*—Thompson Coburn LLP

(57) ABSTRACT

Disclosed herein is a system architecture capable of processing fixed length and/or variable length data packets. Under the method of the invention, incoming data packets are queued together according to their corresponding switch processing parameters (SPPs), and then the commonly-queued data packets are processed through a switch fabric as a single unit. In one aspect of the invention, the commonly-queued data packets are processed by the switch fabric as a single train packet. In another aspect of the invention, the commonly-queued data packets are sliced into a set of subtrain packets. A switch fabric then processes the set of subtrain packets in parallel using a plurality of switch planes. Both aspects of the invention can be implemented with a plurality of packet formatters and deformatters linked to a switch fabric in various configurations, including multi-path and hierarchical switching systems. a multichannel switching system.

9 Claims, 16 Drawing Sheets

METHOD AND APPARATUS FOR HIGH SPEED PACKET SWITCHING USING TRAIN PACKET QUEUING AND PROVIDING HIGH SCALABILITY

TECHNICAL FIELD

The present invention relates to a high speed switch capable of processing both fixed length and variable length data packets. A switch employing the present invention can be easily and flexibly scaled to accommodate very high speeds. Further, a switch employing the present invention can be configured to separate incoming traffic into a plurality of paths on the basis of various quality of service (QoS) factors prior to sending data packets through a switch fabric, wherein each path can be assigned a different QoS performance and a different bandwidth, thereby allowing the switch to be scaled to very high speeds while still guaranteeing different levels of QoS.

BACKGROUND OF THE INVENTION

Today's Internet applications, such as web browsing, on-line shopping, and voice over IP (VOIP) are ubiquitous. The growing popularity of the Internet and new high bandwidth applications, such as video-on-demand (VOD), distance learning, video conferencing and medical/imaging are causing a dramatic increase in network traffic. Statistics show that average Internet traffic is doubling every three months. Meanwhile, an increasing number of applications require various levels of QoS, with guarantees of low latency and minimum bandwidth.

One way to handle the increasing demands is to increase the bandwidth capacity of switches. FIG. 1 shows a conventional switch in which incoming data packets 100 are processed according to their switch processing parameter (SPP) 102. The SPP may include a destination port number, priority, or other parameters within the data packet that is used by the switch to determine the appropriate switching process for the packet. The switch 104 must be able to perform global processing of all incoming data packets and route those data packets to the proper output port in accordance with the SPP of the data packet. As can be seen in FIG. 1, data packets with an SPP of "Y" are switched to output port 1 while data packets with an SPP of "X" are switched to output port K. However, as line rates increase, the interval time between the arrival of successive minimum-sized data packets at the input ports decreases, thereby decreasing the amounts of time available for global processing. Thus, the conventional switch has a fundamental scaling limitation as line rates increase because the line rate may increase to a level beyond the processing capability of the switch.

The mismatch that is developing between increasing line rates and switch processing capabilities has resulted in a bottleneck that occurs at switch nodes. Therefore, it is desirable to scale a switch so that it has higher bandwidth capacity. Two methods that are known in the art for scaling systems to higher capacities are multi-channel switching and bit slicing.

Under the multi-channel approach, multiple physical ports of a switch are grouped as a higher rate logical port. An example of such a switch is shown in FIG. 2. U.S. Pat. No. 5,838,679 issued to Kim et al. and U.S. Pat. No. 5,526,352 issued to Min et al., the entire disclosures of which are hereby incorporated by reference, disclose switches implementing the multi-channel switching approach. Multi-channel switching can provide high rate switching by exploiting the concept of channel grouping. As shown in FIG. 2, several input ports are grouped together as a channel, as are the output ports. Instead of being routed to a specific output port, data packets are routed to any output port belonging to an appropriate channel. With this configuration, several low rate ports can be grouped together and served as a high rate channel, thereby providing higher throughput. However, while multi-channel switching increases the bandwidth capacity for one logical channel, it does not increase the capacity of the system as a whole.

Under the bit slicing approach, each incoming data packet is divided into a number of subpackets. The subpackets are then passed in parallel through a switch fabric having a plurality of switch planes. U.S. Pat. No. 5,440,550 issued to Follett, the entire disclosure of which is hereby incorporated by reference, discloses a switch using bit slicing. FIG. 3(a) depicts an example of a switch using the bit slicing approach. FIG. 3(b) depicts a data packet before and after being sliced in the switch of FIG. 3(a). As the data packet 110 arrives at the input (point A2) of the slicing unit 106, the data packet will have the form as shown in FIG. 2(b). The slicing unit 106 will then slice the data packet evenly into N sub-packets, wherein N is the number of switch planes in the switch fabric. Each sub-packet maintains the same routing information or SPP of the data packet from which it was sliced, and each sub-packet contains 1/N of the original data packet from which it was sliced. The switch fabric is comprised of N identical switch planes 108 that are stacked together to provide a set of switches through which the sub-packets are processed in parallel. Each switch plane will process only 1/N of the original data packet rather than the full original data packet. After the sub-packets are processed by the switch fabric, they arrive in parallel at an assembler unit 116. The assembler unit then reconstructs the original data packet 110.

Because the number of switch ports is increased by a factor of N (there are N switch planes with K ports, as opposed to the switch of FIG. 1 which has only one switch plane with K ports) and because the line rate of each port remains constant, the stacked switch fabric used with bit slicing increases the overall system bandwidth capacity. However, because each successive sub-packet that reaches the switch will have a shorter length (only 1/N of the original data packet), the switch fabric must be able to process each sub-packet at N times the rate of processing in the single switch plane case. This property of bit slicing creates a problem when the switch is further scaled (larger and larger values for N), or when the line rate of the ingress ports is very high, because eventually a point is reached where the switch fabric does not have a sufficient amount of time to process a sub-packet before the next subpacket arrives. For the sub-packet, at each of the K ports of the switch plane, the switch plane must basically read the SPP, determine which output port is associated with that SPP, and route the sub-packets to the appropriate output port in accordance with the SPP in a non-blocking manner.

For example, when using bit slicing to scale an ATM switch from OC-48 (a line rate of approximately 2.488 Gb/s (gigabits per second)) to OC-192 (a line rate of approximately 10 Gb/s), the amount of time that the switch has to process each ATM cell decreases by a factor of four from 170 ns to 42.5 ns. With only 42.5 ns to process a subpacket, a switch running on a clock of 100 MHz must be able to perform global header processing every four clock cycles. Efficient implementations of switches having K input ports usually require K clock cycles to perform global header processing. So, for K=16 (as is common), 16 clock cycles are typically required. So when a switch has 42.5 ns to process a packet, the clock rate would need to be 400 MHz, which is very difficult to implement in a current VLSI design. Therefore, it is apparent that while bit slicing does result in a switch that can be scaled to a higher capacity, bit slicing suffers from a limitation in that the degree of scaling is limited by the speed at which the switch fabric can process SPPS.

It is therefore desirable to develop a switch that can be scaled to a high capacity without surpassing the switch fabric's ability to process incoming packets.

SUMMARY OF THE INVENTION

The present invention discloses a switch architecture using train packet processing in order to provide a scalable, high capacity switch that will not surpass a switch fabric's processing capabilities. In train packet processing, incoming data packets are queued together on the basis of their corresponding SPPs. That is, data packets sharing the same corresponding SPP will be queued together, and a train packet will be created from at least some of the data packets included within the same data packet queue.

The train packet of the present invention is comprised of a payload portion and a header portion. The train packet payload is comprised of data packets that share a common SPP. The train packet header is comprised of the SPP common to the data packets comprising the train packet payload. In some situations the train packet payload will be comprised of a single data packet (as may occur if a single data packet is queued and too much time passes before another data packet sharing that single data packet's SPP is queued with that single data packet).

Thus, as shown in the example of FIG. 14, when four fixed-size data packets sharing the same SPP are received by the switch of the present invention, these packets will be encapsulated in the train packet (as shown at point C5 in FIG. 14). Of course, the number 4 is used by way of example, and the train packet of the present invention can be comprised of any number of data packets. A practitioner of the present invention can choose the number of data packets that will make up the train packet in the actual design to accommodate various design preferences, as will be explained in more detail below. Because each of these data packets shares the same SPP, the resultant train packet will only need to have single SPP attached to it. Therefore, when the train packet is sent across the switch fabric, the switch fabric will be able to process four data packets as a unit while only processing a single SPP (rather than processing four SPPs).

Preferably, prior to transmission across the switch fabric, the train packet is sliced into a plurality of subtrain packets, the plurality of subtrain packets comprising a subtrain packet set. The subtrain packets within a subtrain packet set can then be processed in parallel through a stacked switch fabric. When the train packet is sliced into subtrain packets and the subtrain packets are processed in parallel, the present invention provides many of the advantages of bit slicing without surpassing the processing capabilities of switch fabrics. In most circumstances, each subtrain packet will have a longer length than a sub-packet under the bit slicing approach would have. Therefore, the switch fabric will have more time to process the packet before the next packet arrives. For example, in conventional bit slicing, if a regular data packet is sliced into N subpackets, this will force a switch fabric to process each sub-packet's SPP N times faster. Under the train packet approach of the present invention, if a train packet is comprised of M fixed-size data packets (where M>1), and the train packet is sliced into N subtrain packets, this will force a switch fabric to process each subpacket only N/M times faster. Thus, the present invention will put less strain on the processing capabilities of switch fabrics while still providing a switch that can be scaled to a high capacity. Also, when a train packet comprised of M data packets is processed by the switch fabric, each switch plane will need to process only one SPP per M data packets. However, under bit slicing, a one-to-one correspondence will exist between SPPs processed and data packets processed. The improved ratio of the number of data packets processed to the number of SPPs processed allows the switch to be scaled to a higher capacity and allows the switch to handle higher line rates.

Thus, the present invention is capable of providing a switch that can be scaled to a high capacity without surpassing the processing capabilities of the switch fabric by grouping together data packets sharing a common SPP. By processing commonly-grouped data packets at the same time, the present invention avoids a repetitive processing of the same SPP for each commonly-grouped packet. The processing time saved by reducing the number of SPP processings required by the switch fabric allows a switch of the present invention to be capable of handling high line rate data traffic. Also, as will be explained in more detail below, the present invention is sufficiently flexible to be implemented in a variety of system architectures.

Preferably, a packet formatter is configured to create the train packets or subtrain packet sets of the present invention. A packet formatter configured to create only train packets can be referred to as a packet formatter configured for sequential train packet processing. A packet formatter configured to create subtrain packet sets can be referred to as a packet formatter configured for sequential to parallel train packet processing.

A packet formatter configured for sequential train packet processing preferably comprises a packet queuer that queues together data packets according to their SPPs such that data packets sharing a common SPP are commonly-queued. The packet queuer can be configured to create train packets having varying lengths or a fixed length. When the packet formatter is configured to create train packets having a variable length, the train packets will preferably have lengths ranging between a minimum and a maximum value.

Also, the packet queuer can be configured to create train packets from commonly-queued data packets once those commonly-queued data packets have an aggregate data packet length greater than or equal to a pre-selected maximum threshold value.

Further, the packet queuer can be configured to create a train packet from whatever is queued in a non-empty data packet queue upon passage of a pre-selected time period after which that data packet queue became non-empty. That is, if a data packet has been received by the packet queuer and too much time passes before another data packet sharing the SPP of that data packet is received by the packet queuer, the packet queuer will create a train packet having a payload comprised of that single data packet (and possibly some padding bytes if the data packet is smaller than the train packet's minimum payload length). Also, if the packet queuer is configured with a minimum train packet length that corresponds to the length of three fixed-size data packets, and a particular data packet queue has only two fixed-size data packets queued therein, then the packet queuer will create a train packet having a payload comprised of those two data packets plus enough padding to meet the minimum length requirement once a threshold amount of time has passed since the first packet was received in that queue. This time constraint prevents data packets from experiencing an undue delay in the packet formatter.

When the packet formatter is configured for sequential to parallel train packet processing, the packet formatter will further comprise a slicing unit which receives train packets from the packet queuer and slices them into subtrain packet sets. Each subtrain packet set will be comprised of N subtrain packets, wherein N>1. To create the subtrain packet set, the slicing unit will slice the payload of a train packet into N slices. These slices will serve as the payloads of the subtrain packets. Thus, if the payloads of the subtrain packets within a set are viewed in the aggregate, the aggregate subtrain payload for the set would equal the payload of the train packet. The headers of the subtrain packets will include the SPP in the header of the train packet from which that subtrain packet was sliced. Preferably, the subtrain headers will include the entire header of the train packet from which the subtrain packet set was sliced. It is also preferable that the subtrain headers include slicing information for the set, which will aid in identifying how the train packet can be reassembled at the deformatting stage. That is, subtrain packet(0) which includes a first 1/N portion of a train packet payload and subtrain packet(N−1) which includes the final (or (N−1)th) 1/N portion of the train packet payload can encapsulate information in their headers that enables a deformatter to properly sequence the subtrain packets so the train packet payload can be reassembled 0 through N−1.

On the deformatting side of the switch, a packet deformatter used in a switch employing sequential train packet processing will extract the data packets from the payloads of the train packets. A packet deformatter used in a switch employing sequential to parallel train packet processing will first reassemble train packets from received subtrain packets before extracting the data packets from the reassembled train packets.

Thus, the present invention is capable of providing a switch that can be scaled to a high capacity without surpassing the processing capabilities of the switch fabric by grouping together data packets sharing a common SPP. By processing commonly-grouped data packets at the same time, the present invention avoids a repetitive processing of the same SPP for each commonly-grouped packet. The processing time saved by reducing the number of SPP processings required by the switch fabric allows a switch of the present invention to be capable of handling high line rate data traffic. Also, as will be explained in more detail below, the present is sufficiently flexible such that it can be implemented in a variety of system architectures.

These and other features and advantages of the present invention will be in part apparent, and in part pointed out, hereinafter.

DETAILED DESCRIPTION OF THE PREFERRED EMBODIMENTS

The present invention provides a switch where incoming data packets are queued together on the basis of their corresponding SPPs. Under one embodiment, referred herein as sequential train packet processing, data packets sharing the same SPP are encapsulated in a train packet and the train packet is sent across a switch fabric. When this train packet is sent through the switch fabric, only one SPP will need to be processed. Thus, if the train packet is comprised of say, ten data packets, the switch fabric will process those ten data packets with only a single SPP processing. Because the present invention decreases the frequency with which the switch fabric must process SPPs, the switch can be scaled to a high capacity without exceeding the SPP processing capabilities of the switch fabric.

Under another embodiment of the present invention, rather than sending the train packet across the switch fabric as a unit, the train packet is sliced into a set of subtrain packets prior to transmission across the switch fabric. Each subtrain packet within the set of subtrain packets is then sent in parallel across a stacked switch fabric having a plurality of switch planes. This approach is referred to herein as sequential-to-parallel train packet processing, and provides many of the advantages of bit slicing without overwhelming the SPP processing capabilities of the switch fabric.

Figure 1:
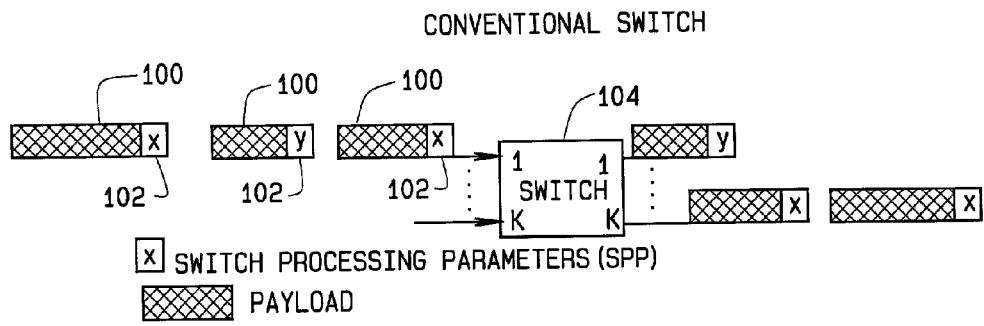
FIG. 1 depicts a conventional switch that processes each data packet individually.
Figure 2:
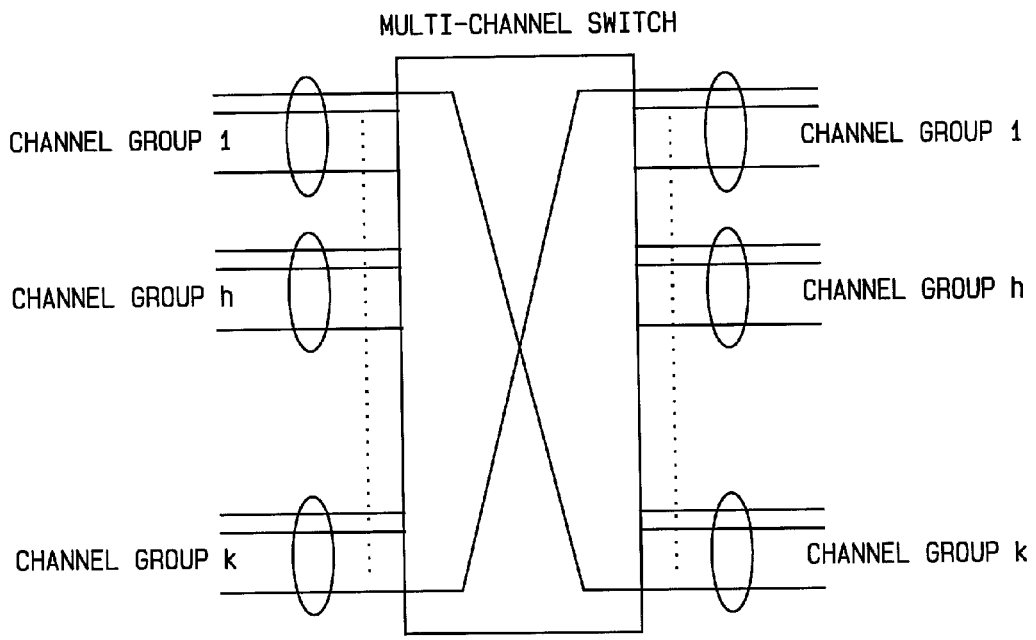
FIG. 2 depicts a switch employing multi-channel grouping.
Figure 3A:
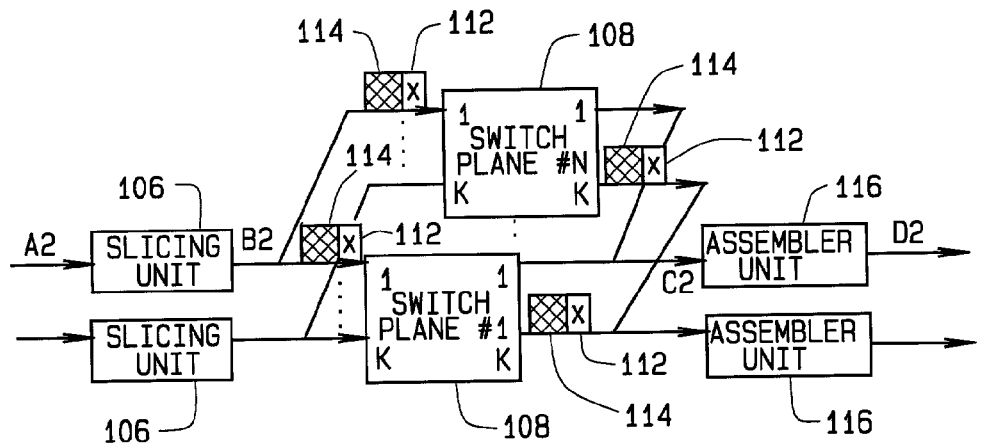
FIG. 3(a) depicts a switch employing bit slicing to slice each incoming data packet into subpackets and then send those subpackets in parallel across the switch.
Figure 3B:
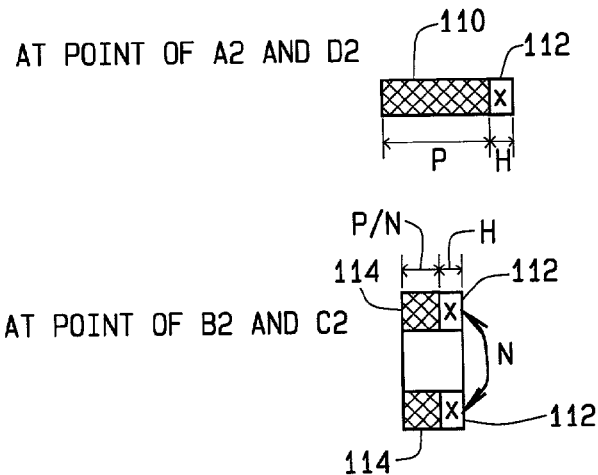
FIG. 3(b) illustrates data traffic at various points within the switch of FIG. 3(a)
Figure 4A:
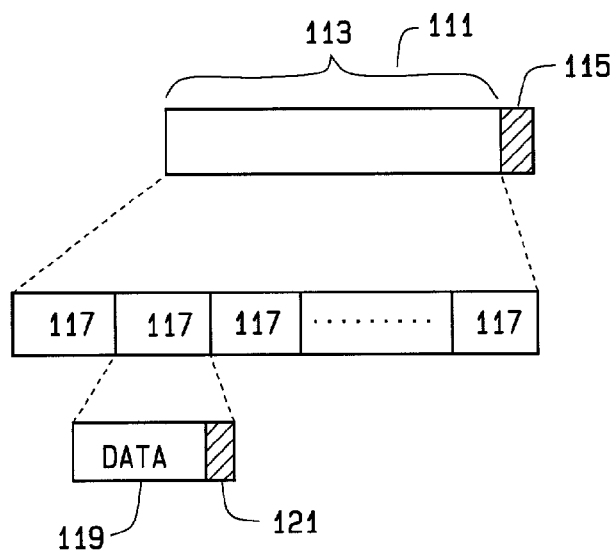
FIG. 4(a) depicts an example of the train packet of the present invention.

FIG. 4(a) depicts an example of the train packet of the present invention. Train packet 111 is comprised of a payload portion 113 and a header portion 115. The train packet payload 113 contains the data packets that share a common SPP. Preferably the payload will contain a plurality of data packets sharing a common SPP, but situations may arise where the payload 113 contains only a single data packet. Such a situation may arise if too much time elapses between the arrival of data packets sharing a common SPP. Rather than forcing the first data packet to wait until a second data packet with that SPP arrives, a train packet can be created from the single data packet upon the passage of a preselected amount of time from the time that the single data packet is received.

The train packet payload 113 can have a variable or a fixed length. Also, the payload 113 is preferably made up of a plurality of payload blocks 117. Each payload block can be either fixed-length or variable length. Each payload block 117 preferably comprises a data portion 119 and a control header portion 121. The data portion 119 may contain one or more data packets, a portion of a data packet, padding bytes, or some combination thereof depending upon the size constraints of the payload blocks, train packet length, and queue contents when the train packet is created. Padding bytes would be needed when the amount of useful data (data packets) to be encapsulated in the payload block is less than the length of the payload block. To ensure that the payload block has the requisite length, padding bytes are encapsulated in the data portion 119 to give the payload block the requisite length. The control header 121 of each payload block will contain control information for the payload block. The control header will contain information that will aid in the deformatting of the train packet, such as the length of the payload block, how much useful data is in the data portion 119 of the payload block, the position of the payload block within the train packet payload (whether it is the last block of the train packet payload), and segmentation information for the payload block. Segmentation information may be needed when the train packet payload encapsulates a data packet having a length greater than the length of the data portion 119 of a payload block 117. In such situations, the long data packet will overflow from one payload block into the next. The segmentation information in the control header 121 can flag when this situation exists and identify how many bits of overflow there are.

Also, it must be noted that one could encapsulate the control header information for each of the payload blocks within the train packet header. In such cases, the payload blocks 117 would not need a control header portion because the control information would be included in the train packet header 115.

The train packet header 115 will contain the SPP for the train packet. This SPP will be the SPP shared by the constituent data packets of the train packet payload 113. The train packet header may also contain information such as the length of the train packet, whether the train packet has a fixed length or a variable length, etc. As noted, the control information for the payload blocks can be encapsulated in the train packet header 115 rather than in separate control headers 121 in the payload blocks 117.

Figure 4B:
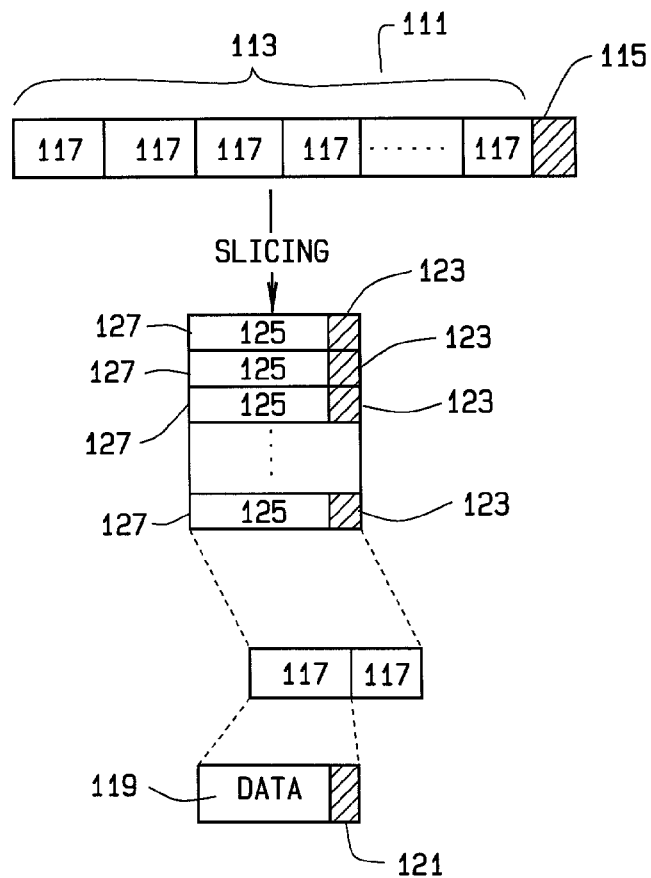
FIG. 4(b) depicts an example of a set of subtrain packets of the present invention created from the train packet of FIG. 4(a)

In sequential train packet processing (which will be discussed in more detail below), the train packet 111 will be sent as a unit across a switch fabric to be routed to its destination according to the SPP encapsulated within the train packet header. In sequential to parallel train packet processing (which will also be discussed in more detail below), the train packet 111 will be sliced into a set of N subtrain packets upstream from the switch fabric. The set of N subtrain packets will then be sent in parallel across a stacked switch fabric having N switch planes. Each switch plane will route one of the subtrain packets within the set according to its SPP. FIG. 4(b) depicts the format of the subtrain packets.

In FIG. 4(b), one can see a train packet 111 (as described in connection with FIG. 4(a)) that has been sliced into a set of N subtrain packets 127. Each subtrain packet is comprised of a subtrain payload 125 and a subtrain header 123. Preferably, each subtrain packet 127 within a set of subtrain packets will have an equal length and be formed from a 1/N slice of the train packet payload 113. Thus, each subtrain packet payload 125 may comprise one or more payload blocks 117, a portion of a payload block, padding bytes, or some combination thereof. The subtrain packet header will comprise the information contained in the train packet header 115 and, if necessary, slicing information for the subtrain packet. The slicing information will identify the boundaries between slices of the train packet payload 113 and will aid in the reassembly of the train packet payload 113 from the N subtrain packet payloads 125 once the set of subtrain packets has been routed through the switch fabric.

Figure 5:
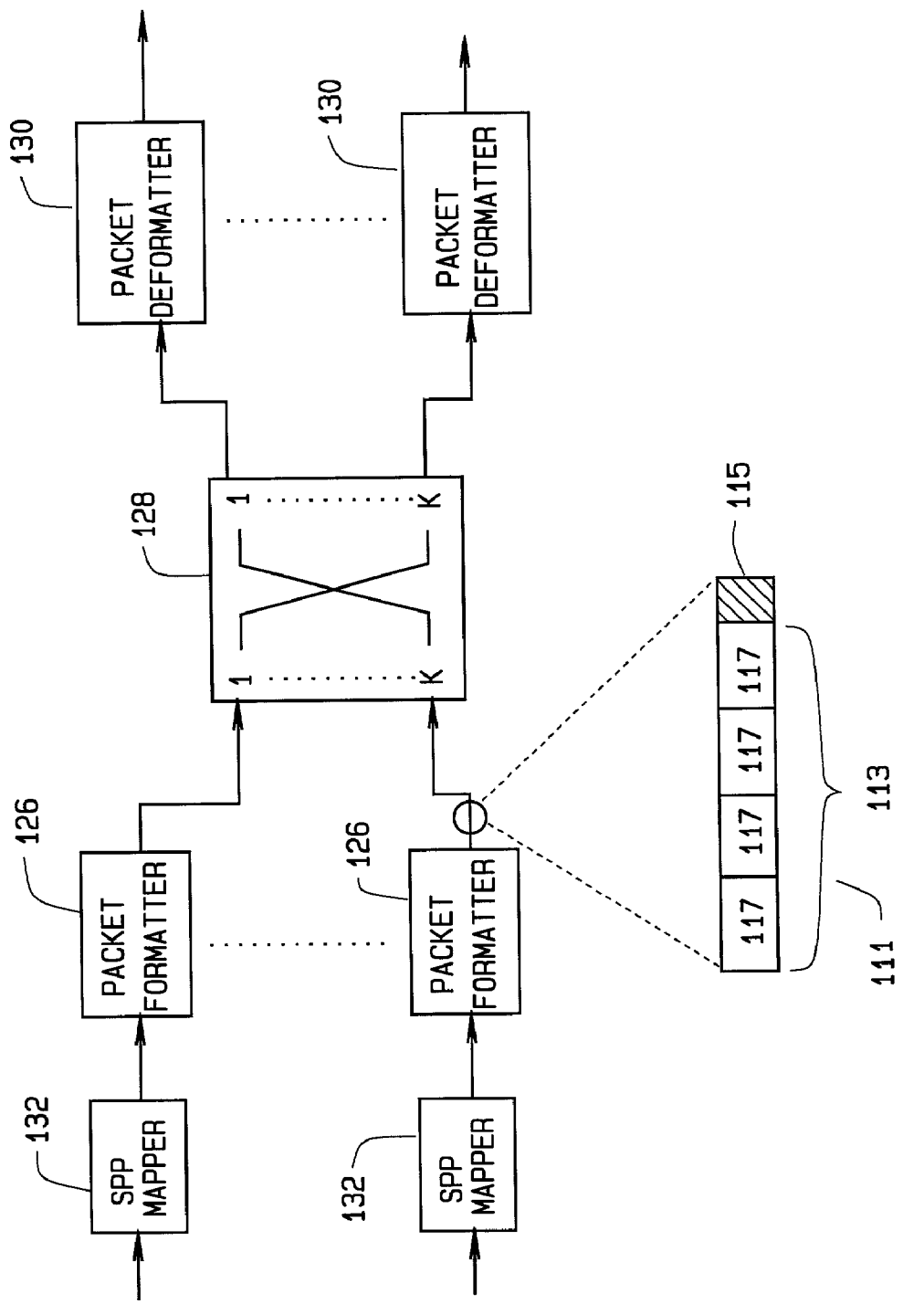
FIG. 5 depicts an embodiment of the present invention employing sequential train packet processing.

FIG. 5 depicts a switch of the present invention using sequential train packet processing. In sequential train packet processing, a packet formatter 126 is configured to create train packets 111 and pass each train packet 111 through the switch fabric 128. The train packets 111 will be as described above in connection with FIG. 4(a). The train packets may have either a fixed length or a variable length depending upon how the packet formatters 126 are configured.

As can be seen in the example of FIG. 5, there are 4 evenly-sized payload blocks 117 making up the train packet payload 113. As data packets arrive at the input of the formatters 126, each formatter queues together the data packets sharing a common corresponding SPP. The formatters then encapsulate commonly-queued data packets to form a train packet payload 113. In this example, we will assume the switch processes fixed-length data packets, and that the length of the data portion of each payload block 117 is equal to the fixed-length of the data packets. Thus, the train packets 111 may encapsulate four data packets sharing a common SPP in its payload. The packet formatter 126 also attaches a train packet header 115 to each train packet payload 113. The SPP shared by the constituent data packets of the train packet payload will be encapsulated in the train packet header 115.

As will be described below, the formatters 126 can be configured to control the size of the train packet. While the train packet in the example of FIG. 5 is comprised of four payload blocks, this number can be varied to match the processing needs of the switch.

After the train packet has been routed through the switch fabric, it is received by a packet deformatter 130. The packet deformatter reconstructs the data packets from which the train packet was created by extracting each individual data packet from the train packet. The deformatter uses the information in the control header of each payload block to restore the original data packets from the train packet payload. The reconstructed data packets are then outputted from the packet deformatter.

The basic function of the SPP mappers 132 is to classify incoming data packets and to attach the SPP 124 to each data packet. The SPP may be a vector, having multiple fields of information which the switch 128 will use to process the packet. The SPP may include the output port address, priority, or some other parameters. The SPP mapper can be implemented with any generic classification algorithm that determines the SPP using header information, payload fields, or some other criteria. After passing through the SPP mapper, data packets are processed and routed based on their SPPs, instead of their header information. For ATM traffic, the SPP mapper may use both VPI/VCI and QoS parameters to determine the SPP. If two ATM packets have the same QoS parameters and the same outgoing port, they can be stamped with the same SPP, even though they may belong to different connections or they may have different headers. Packets with the same SPPs will be processed in the same manner by the formatters 126, switch fabric 128, and deformatters 130. If desired, a practitioner of the present invention can configure the packet formatters to perform SPP mapping functions.

Figure 6:
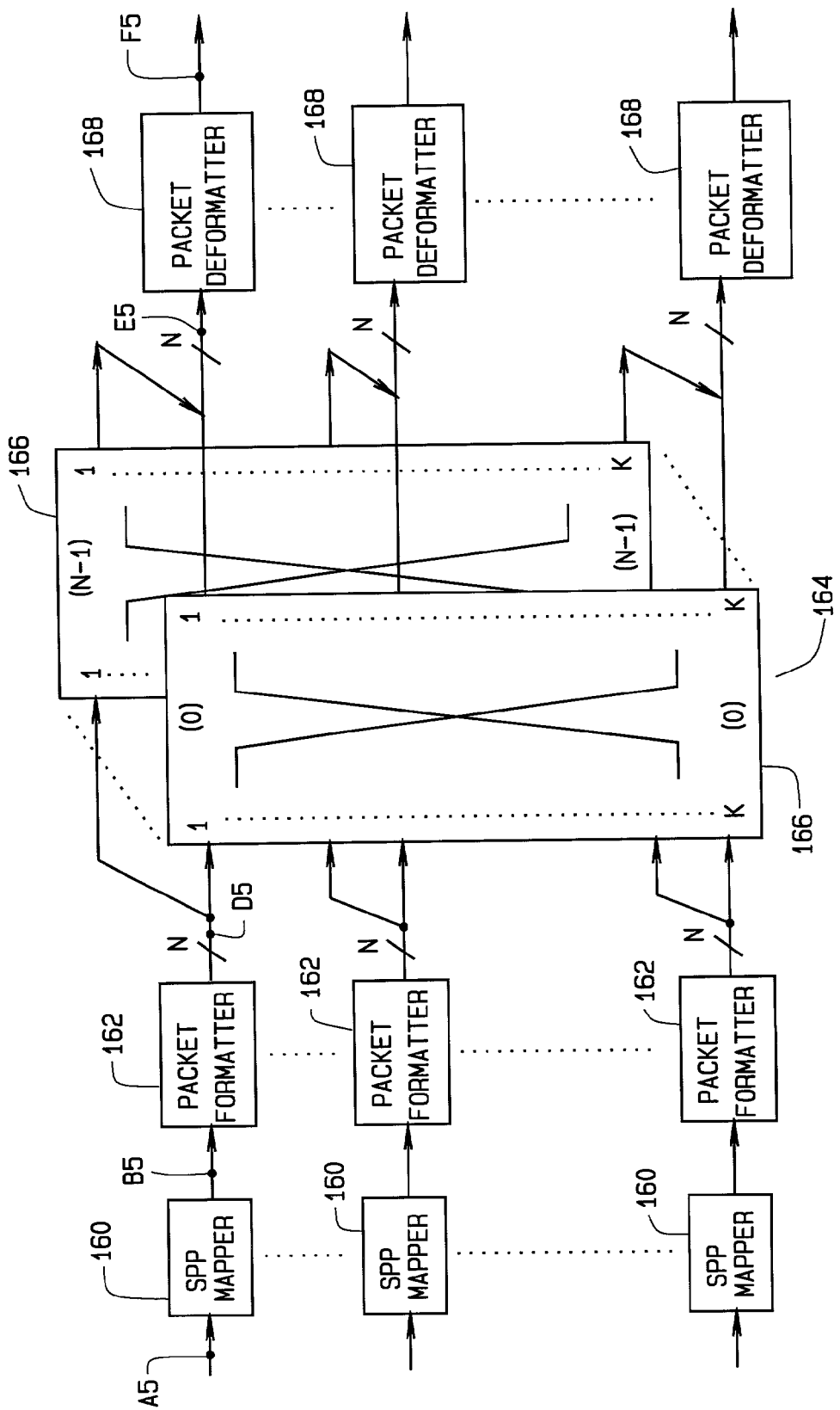
FIG. 6 depicts an embodiment of the present invention employing sequential to parallel train packet processing.

FIG. 6 depicts an embodiment of the present invention employing sequential to parallel train packet processing. In FIG. 6, the switch fabric 164 has N K by K switch planes 166. Preferably, there will be K packet formatters 162, each with an input port and N output ports. Preferably, there will be K SPP mappers 160, each having an input port for receiving data packets, and an output port for outputting data packets with an attached SPP to an input port of a formatter. However, as mentioned, the packet formatter can be configured to provide SPP mapping functions. Also, there will preferably be K packet deformatters 168, each having N input ports and an output port.

As data packets and their attached SPPs are received by the packet formatters 162, the formatters will construct train packets from the data packets sharing a common corresponding SPP, as described above in connection with sequential train packet processing. Next, the packet formatter will slice each train packet into a set comprised of a plurality of subtrain packets. Each subtrain packet within the set of subtrain packets will preferably have the same size. The number of subtrain packets within each set of subtrain packets is preferably equal to the number of switch planes (N). The format of the set of N subtrain packets will be as described above with respect to FIG. 4(*b*).

Figure 7A:
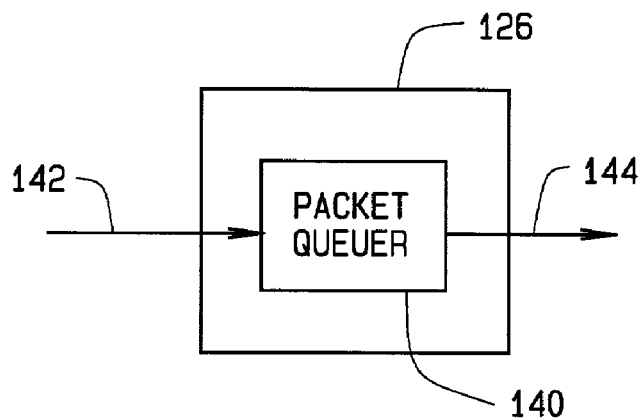
FIG. 7(a) is a block diagram depicting the packet formatter used in sequential train packet processing.
Figure 7B:
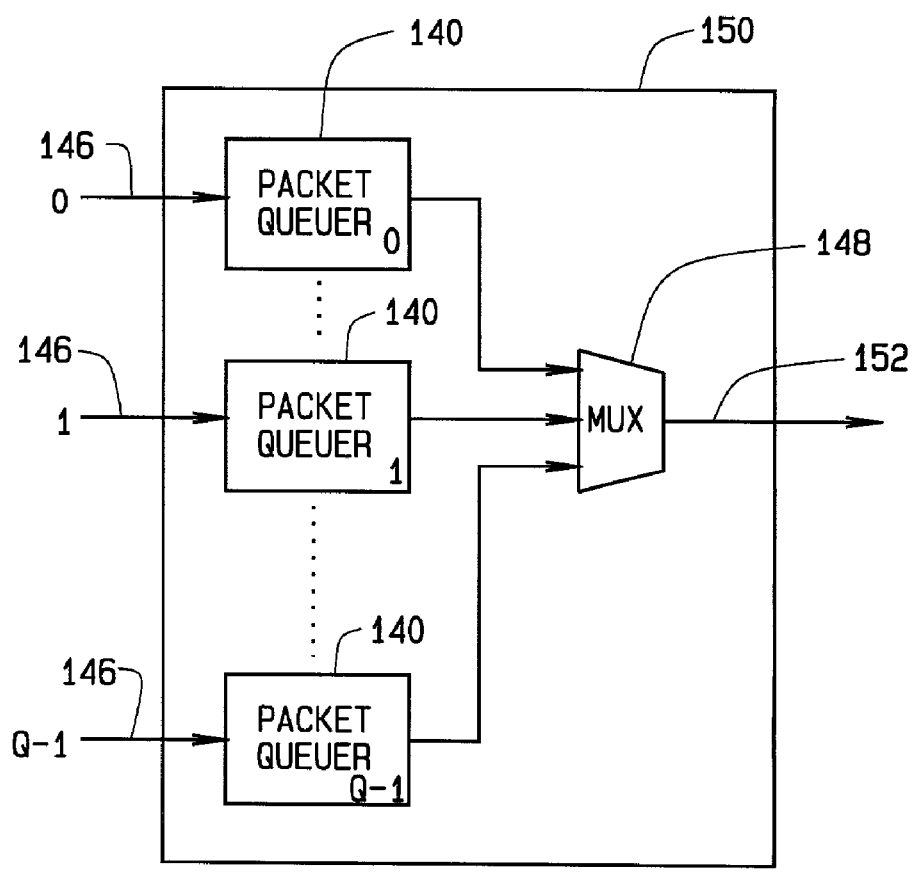
FIG. 7(b) is a block diagram depicting the packet formatter used in sequential train packet processing wherein the packet formatter has a plurality of input ports.

FIG. 7(*a*) is a block diagram depicting a packet formatter used in conjunction with sequential train packet processing. Formatter 126 is preferably comprised of at least one input port 142, a packet queuer 140 linked to the input port, and an output port 144 linked to the packet queuer. The input port 142 receives packets and their corresponding SPPs from the SPP mapper; and then provides the same to the packet queuer 140. Packet queuer 140 then queues the received data packets according to their corresponding SPPs. That is, data packets sharing the same corresponding SPP will be commonly-queued. Packet queuer 140 then creates train packets by encapsulating the commonly-queued data packets in a train packet payload. The packet queuer 140 also attaches to each train packet the SPP shared by each data packet making up that train packet. The process used by the packet queuer in creating the train packet will be described in more detail below. Thereafter, each train packet and its attached SPP are provided to the formatter output 144.

FIG. 7(*b*) is a block diagram depicting a packet formatter used in sequential train packet processing wherein the packet formatter 150 has Q input ports 146, wherein Q>1. Each input port 146 is linked to a packet queuer 140. Each packet queuer 140 functions like the packet queuer described above. The train packets outputted by each packet queuer are then passed to a multiplexor 148 which converts the parallel stream of train packets coming from the packet queuer into a serial stream of train packets going to the formatter output port 152. Packet formatter 150 allows multiple links to share a single switch input port.

Figure 8A:
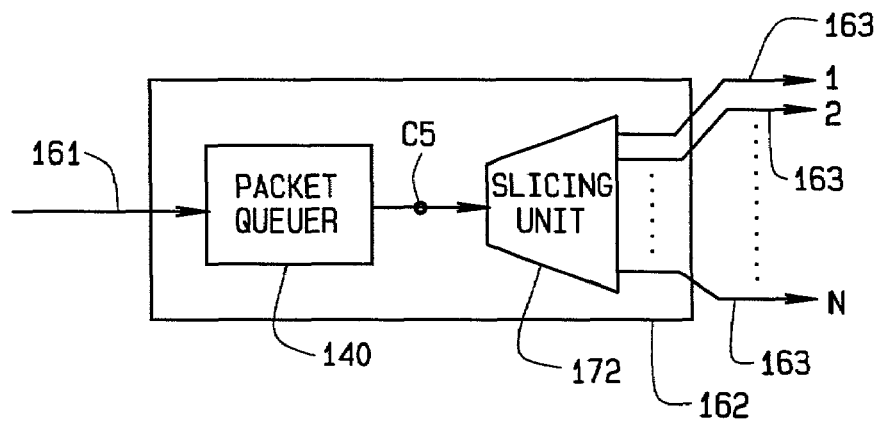
FIG. 8(a) is a block diagram depicting the packet formatter used in sequential to parallel train packet processing.
Figure 8B:
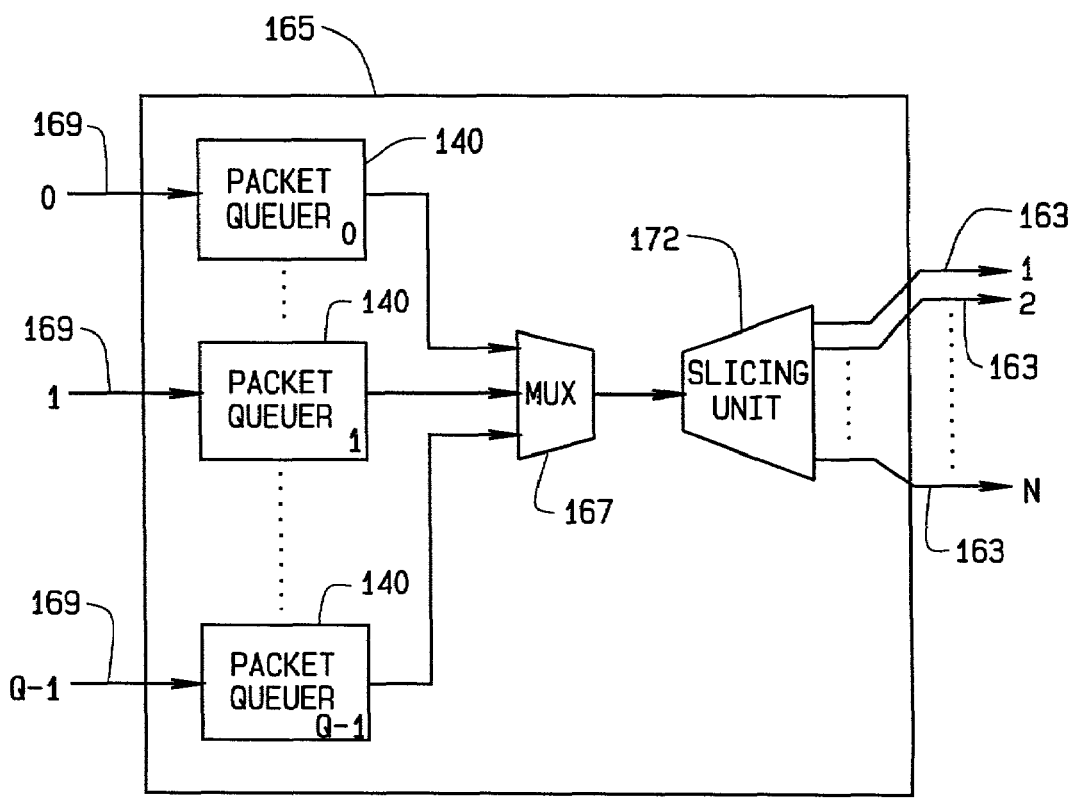
FIG. 8(b) is a block diagram depicting the packet formatter used in sequential to parallel train packet processing wherein the packet formatter has a plurality of input ports.

FIG. 8(*a*) is a block diagram depicting a packet formatter used in conjunction with sequential to parallel train packet processing. Packet formatter 162 is preferably comprised of one input port 161, a packet queuer 140 linked to the input port 161, a slicing unit 172 linked to the packet queuer 140, and N formatter output ports 163, each of which is linked to the slicing unit 172. The packet queuer 140 functions essentially as described above except that the train packets it produces are provided to the slicing unit 172 rather than a formatter output port.

The slicing unit 172 slices each train packet into a set of N subtrain packets. More specifically, the slicing unit slices the train packet payload into N subtrain packet payloads. The slicing unit will also generate the subtrain packet headers that will be attached to each subtrain packet payload, to thereby create the subtrain packets. As described above in connection with FIG. 4(*b*), the slicing unit will generate the subtrain packet header by adding slicing information for the subtrain packets to the train packet header. Of course, included within the subtrain header will be the SPP corresponding to each of the data packets making up the payloads of the set of subtrain packets. The slicing unit 172 then outputs each subtrain packet within a subtrain packet set in parallel through the N formatter output ports.

FIG. 8(*b*) is a block diagram depicting a packet formatter used in sequential to parallel train packet processing wherein the packet formatter 165 has Q input ports 169, wherein Q>1. Each input port 169 is linked to a packet queuer 140. Each packet queuer 140 is linked to a multiplexor 167. The multiplexor is linked to a slicing unit 172, and the slicing unit 172 is linked to each of the N formatter output ports 163. Packet queuers 140 and slicing unit 172 function as described above. The multiplexor 167 functions to convert a parallel stream of train packets coming from the packet queuers into a serial stream of train packets going to the slicing unit. Packet formatter 165 allows multiple links to share a single input port on the switch planes.

Also, with both sequential train packet processing and sequential to parallel train packet processing, it should be noted that another way of allowing multiple links to share a single switch input port would be to use a multiplexor upstream from the packet formatter. In such instances, the packet formatter could be configured as shown in FIG. 7(*a*) for sequential train packet processing or FIG. 8(*a*) for sequential to parallel train packet processing.

Figure 9:
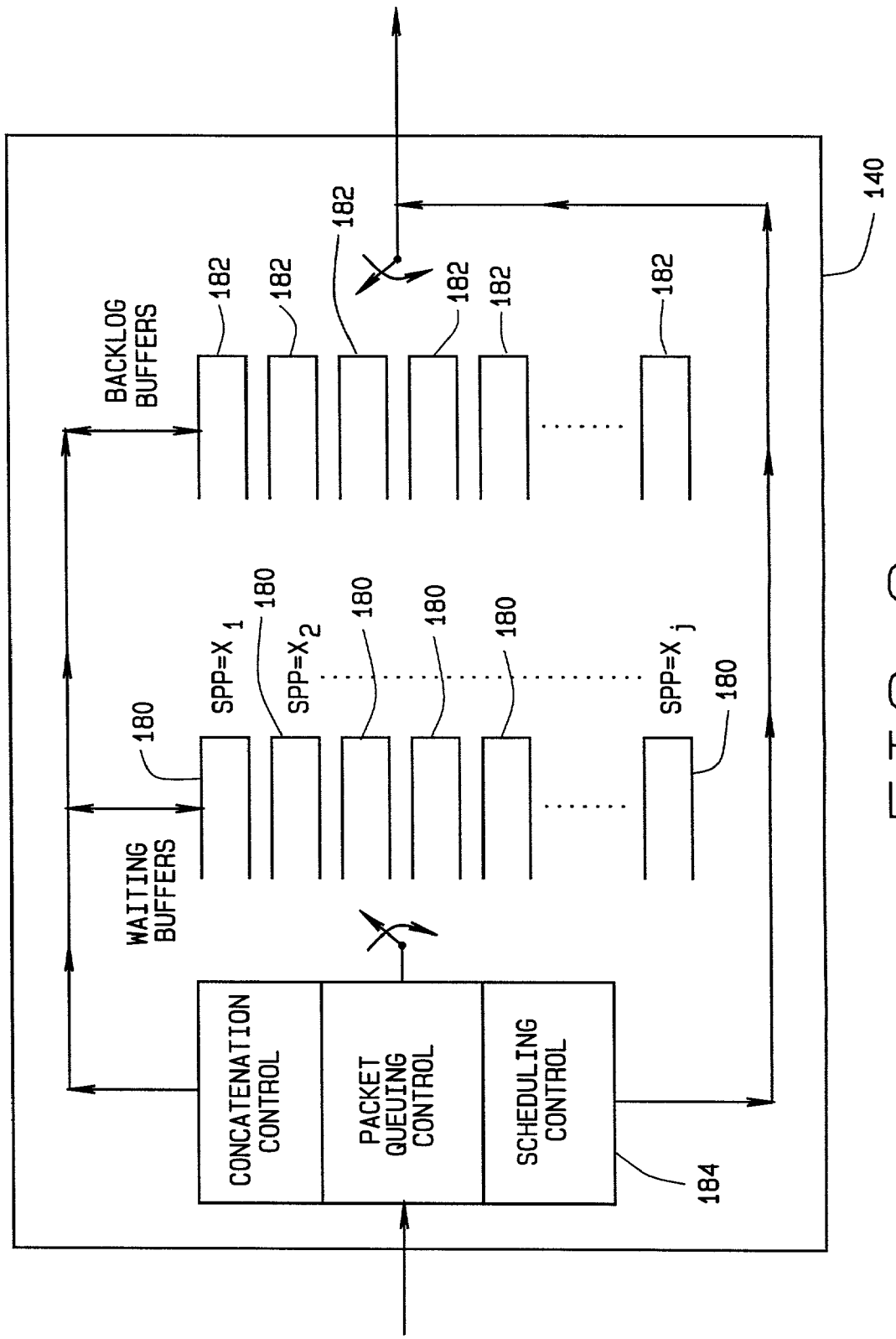
FIG. 9 is a block diagram of the of the packet queuer of the present invention.

FIG. 9 is a block diagram of the packet queuer. Packet queuer 140 is preferably comprised of a plurality of waiting buffers 180, a plurality of backlog buffers 182, and a controller 184 linked to the waiting buffers and the backlog buffers. The controller 184 preferably controls the three basic functions of the packet queuer: queuing received data packets, creating train packets, and scheduling when train packets are provided to the packet queuer output port.

Each waiting buffer 180 corresponds to an SPP, and is configured to buffer data packets with that corresponding SPP. In the example of FIG. 9, it can be seen that the topmost waiting buffer queues data packets with an SPP of $X_1$, while the bottom most waiting buffer queues data packets with an SPP of $X_j$. The controller is configured to queue each received data packet into the appropriate waiting buffer according to the SPPs corresponding to each data packet.

Each backlog buffer 182 corresponds to a waiting buffer 180. After the controller creates a train packet from the data packets that are commonly-queued, the train packet will be moved to the backlog buffer corresponding to the waiting buffer from which that train packet is being moved. The backlog buffers 182 therefore queue train packets that are awaiting transmission to the packet queuer output port. Controller 184 is preferably configured to schedule when each train packet queued in a backlog buffer is provided to the packet queuer output port. This scheduling can be implemented using generic scheduling algorithms known in the art.

Figure 10:
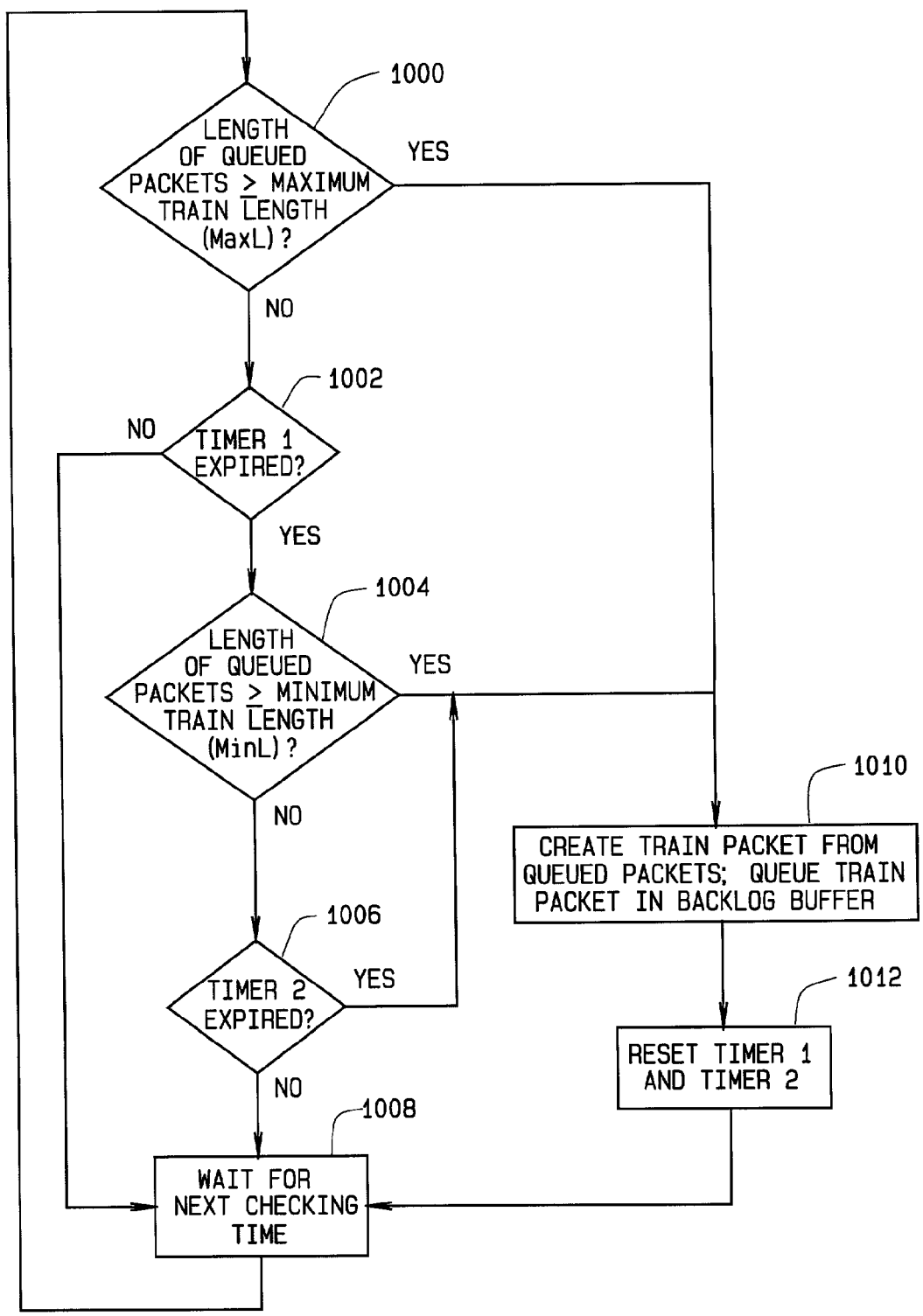
FIG. 10 is a flow chart describing how the packet formatter controls the creation of train packets.

FIG. 10 is a flow chart describing how the packet formatter can be configured to control the creation of train packets. The present invention is capable of processing both fixed length data packets (i.e., ATM cells) and variable length data packets (i.e., IP data packets). Further the present invention can be implemented to create train packets having either a fixed length or a variable length.

The packet formatter preferably uses 7 parameters when generating train packets: MaxPL, MinPL, MaxL, MinL, Timer1, Timer2 and N. MaxPL and MinPL are used by the packet queuer, and these two parameters define the range of train packet lengths for train packets created by the packet queuer. N is used by the slicing unit. The value of N should be equal to the number of switch planes. Each SPP-based waiting buffer can have different values of MaxL, MinL, Timer1 and Timer2 according to the different QoS factors that can be associated with each waiting buffer. Further, the packet queuer runs the algorithm described in FIG. 10 for each waiting buffer independently. MaxPL defines the maximum aggregate length of data packets that the train packet payload can accommodate. MinPL defines the minimum aggregate length of data packets that are needed in the train packet payload. Each packet queuer will maintain a single MaxPL and a single MinPL value that applies to all train packets it creates. MaxL defines the maximum aggregate length of data packets that a train packet payload can encapsulate for a specific waiting buffer. Each waiting buffer can have a different MaxL value. MaxL should be less than or equal to MaxPL. MinL is the minimum length of useful data in the train packet when Timer2 is not expired. MinL can be any number between 1 and MaxL. Each waiting buffer may have its own MinL value. Timer1, combined with MinL, can control and balance the train queuing delay and the bandwidth waste that results when sending train packets with padding bytes through the switch fabric. Timer2 sets the ultimate threshold for how long the data packets wait in the waiting buffer.

The algorithm depicted in FIG. 10 is run for each waiting buffer within the packet queuer. At step 1000, a comparison is made between the aggregate length of data packets within the waiting buffer and MaxL. If the length of queued data packets is greater than or equal to MaxL, then the queued packets are ready for conversion into a train packet, and the process moves on to step 1010. If the length of the queued data packets is less than MaxL, then the process proceeds to step 1002 where Timer1 is checked. If Timer1 has not expired, the packet queuer proceeds to step 1008 and waits for the next checking time, and then returns to step 1000. However, if Timer1 has expired, then the packet queuer checks to see whether the aggregate length of the data packets within the waiting buffer is greater than or equal to MinL (step 1004). If the aggregate length of queued data packets is greater than or equal to MinL, then the queued data packets are ready for conversion into a train packet, and the process proceeds to step 1010. However, if the aggregate length of queued data packets is less than MinL, then Timer2 is checked in step 1006. Timer2 sets the ultimate limit for how long a data packet can wait in the waiting buffer before being converted into a train packet. If Timer2 is found to be expired in step 1006, then the packet queuer proceeds to step 1010 and creates the train packets from the queued data packet(s), regardless of the MinL constraint. However, if Timer2 has not expired, the packet queuer waits at step 1008 and returns to step 1000.

Once the packet queuer reaches step 1010, the packet queuer creates a train packet from the data packets within the waiting buffer. If the aggregate length of data packets queued in the waiting buffer is less than MinPL (as would occur if MinL is less than MinPL or if a train packet is created because Timer2 has expired in step 1006), then padding bytes will be added such that the length of the train packet payload is at least MinPL. The data packets will be encapsulated within the payload blocks of the train packet payload as appropriate. The SPP of the data packets will be encapsulated within the train packet header. The newly-created train packet is then shifted to the backlog buffer corresponding to that waiting buffer. In the case of sequential to parallel train packet processing, once in the backlog buffer, the train packet created at step 1010 awaits transmission to the slicing unit. After the train packet is created and transferred to the backlog buffer in step 1010, the packet queuer proceeds to step 1012 and resets Timer1 and Timer2. If the waiting buffer is empty after the train packet was created, Timer1 and Timer2 will begin counting again as soon as a data packet is queued in that waiting buffer. If the waiting buffer still has a data packet (or a portion of a data packet) queued therein after the train packet is created, then Timer1 and Timer2 will start counting again right after step 1012.

Once a train packet is sent from the backlog buffer to the slicing unit, the payload of that train packet will be sliced into a set of N subtrain packet payloads. The slicing unit will also generate a subtrain header for each subtrain payload using the train packet header and slicing information. The subtrain headers will be attached to the appropriate subtrain payloads to from the set of N subtrain packets. These N subtrain packets will be sent in parallel across the switch fabric.

By keeping separate values for MinPL and MaxPL, the packet formatter is thereby capable of creating train packets having a variable size, whose payload has a size falling between MinPL and MaxPL. In the case of creating fixed size train packets, MaxL, MaxPL and MinPL are set to be equal.

MaxL=MaxPL represents the maximum aggregate length of data packets for the train packet payload. MinL is set to improve the train queuing performance, and is typically set not larger than MinPL. If there are not enough data packets to form a train packet when step 1010 is reached, padding bytes are generated to fill in the train packet to ensure that the train packet payload size is at least MinPL. The ratio of MinL/MinPL is the lower bound for the train queuing performance in the normal mode (assuming Timer2 is not expired). As the ratio of MinL/MinPL increases, less padding will be needed in the train packets.

The algorithm of FIG. 10 is easily implemented when processing fixed length data packets such as ATM cells.

Figure 11:
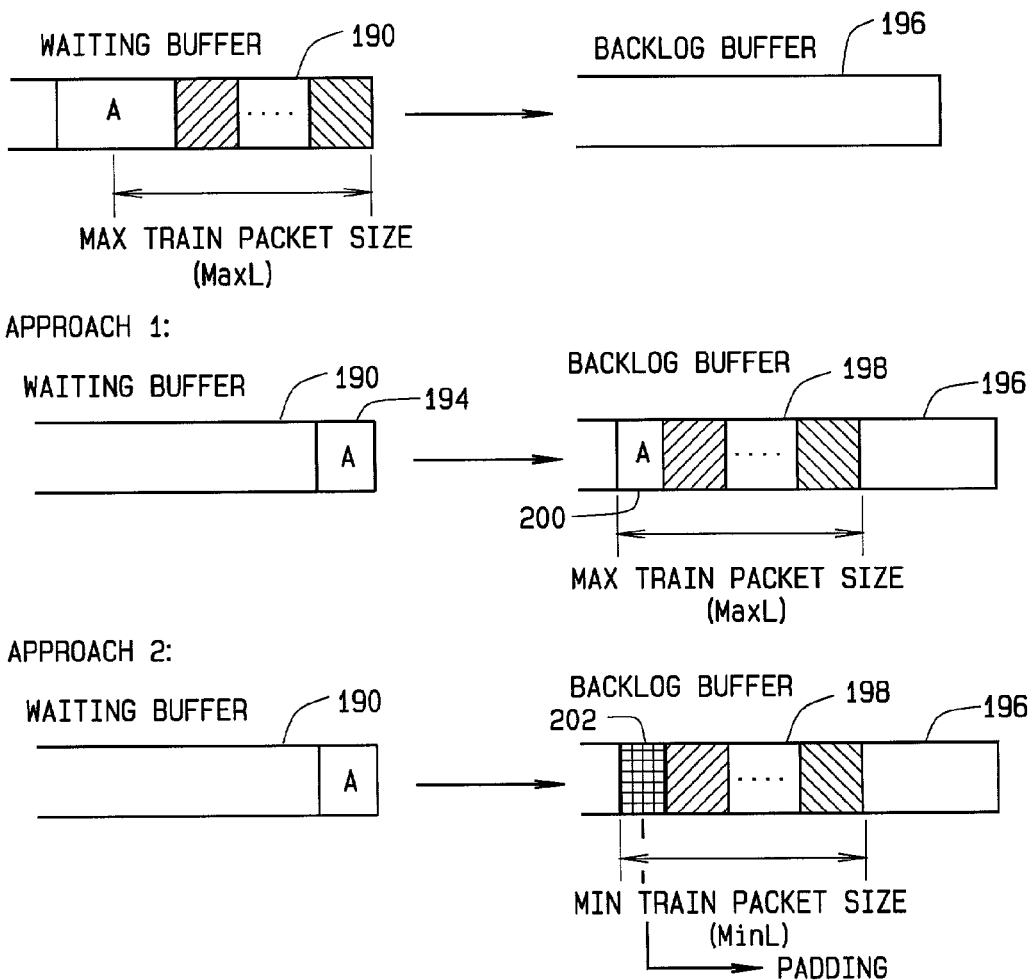
FIG. 11 illustrates two approaches that can be used to create train packets from variable length data packets.

MaxL and MinL can be set to be multiples of the data packet length. For example, MaxL can be set to equal M times the incoming packet length, where M is an integer. MinL can be set to be P times that of the incoming packet length, where P is an integer not larger than M. If M packets have reached the waiting buffer, then step 1000 will determine that MaxL has been met, and the packet queuer will create the train packet. If step 1004 is reached, and there are P or more data packets in the waiting buffer, then the packet queuer will also create the train packet. Assuming that an integer value is selected for M, there will not be any problems caused when an incoming data packet pushes the aggregate length of data packets queued within the waiting buffer beyond MaxL, because the incoming data packets will have a fixed size. Once M packets have been queued, the algorithm will jump to step 1010. However, when processing data packets having variable lengths, such as IP packets, a problem arises when an incoming packet pushes the aggregate length of queued data packets beyond MaxL. In such cases, the train packet that will result will not be able to hold all of the commonly-queued data packets. As seen in FIG. 11, two approaches can be used to solve this problem.

Under the first approach, when incoming packet A pushes the aggregate length of queued data packets in waiting buffer 190 beyond MaxL (for simplicity, the other data packets that would be buffered in the waiting buffer 190 are not shown), the packet queuer divides packet A into a first portion 200 and a second portion 194. The first portion 200 is processed along with the other buffered data packets and is converted into the train packet 198 (as seen in backlogged buffer 196). The second portion 194 remains in waiting buffer 190 and will have to wait until later for conversion into a train packet. The length of portion 200 will be set so that the resultant train packet 198 does not have a length exceeding MaxL. Segmentation information would preferably be encapsulated within the control header of the payload blocks in the resultant train packet to account for the segmentation of packet A.

Under the second approach, when incoming packet A pushes the aggregate length of the queued data packets in waiting buffer 190 beyond MaxL, the packet formatter creates the train packet 198 (seen in backlog buffer 196) as if packet A did not exist. Should the train packet that results from being formed without packet A have a length less than MinPL, padding 202 can be added to the end of the train packet 198 so that it will have a length meeting MinPL.

The slicing number N is preferably equal to the number of switch planes in the switch fabric linked to the slicing unit. The values of MaxL, MinL, Timer1 and Timer2 can be varied for each SPP-based queue to meet the different QoS and throughput needs of the switch. Among these four parameters, MinL and Timer1 are two critical factors for decreasing the train queuing delay. Min{Timer1, MinL/(Average Rate)} is the upper bound of the average train queuing delay in the normal modes wherein Average Rate is the average rate for the aggregated flow rate, which share the same waiting buffer. So for real time traffic, MinL and Timer1 can be set to be small, to thereby decrease the train queuing delay.

Timer2 is set to be a large value to prevent data packets from being queued in the waiting buffer for too long. The value of Timer2 is the upper bound of the train queue delay. In the normal case, the data packets will be converted into a train packet before Timer2 expires. Timer2 is very helpful for low rate connections and high burst traffic.

MaxL acts differently when processing variable length train packets and fixed length train packets. For the variable length train packet, the value of MaxL prevents the formation of an overly large train packet. As stated, each waiting buffer can have a different MaxL value to satisfy different QoS constraints. MaxL for low rate real-time flow may be set smaller than that of high rate non-real-time traffic because shorter train packets means less delay.

For the fixed size train packet (where MaxPL=MinPL=MaxL), each waiting buffer of the packet queuer will share the same MaxL value. The ratio of MinL/MinPL in the fixed-size case is important for throughput performance. In the normal case (i.e., when Timer2 is not expired), the percentage of the useful data packet (that is, the percentage of the data packet not taken up header, is larger than the ratio of MinL/MinPL. The higher the ratio of MinL/MinPL, the less bandwidth that is wasted transmitting padding bytes. For the time-critical traffic, MinL and Timer1 are preferably set small, so that the switch trades off the bandwidth to compensate the delay. For non-real-time traffic, MinL and Timer1 can be set large to reduce the bandwidth wasted when transferring padding bytes.

The bigger the value of N, the higher the bandwidth that the switch can be scaled to, as long as the switch fabric can process subtrain packets with length MinPL/N at wire speed (assume the length of header is negligible). If the switch is to be scaled higher, MinPL has to be increased. But the larger MinPL, the longer delay. This is a design trade off that must be dealt with on a case-by-case basis.

Figure 12:
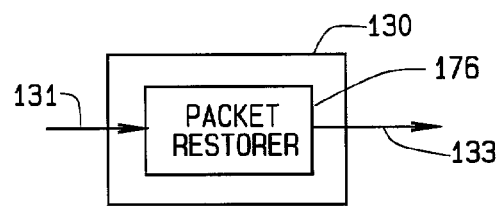
FIG. 12 is a block diagram of the packet deformatter used in sequential train packet processing.

FIG. 12 is a block diagram of the packet deformatter that is preferably used in conjunction with sequential train packet processing. Packet deformatter 130 is comprised of an input port 131, a packet restorer 176 linked to the input port, and an output port 133 linked to the packet restorer. The basic function of the packet restorer 176 is to receive train packets via the input port 131, and extract each individual data packet that exists within the train packet, thereby restoring the data packets that were received by the packet formatters. The packet restorer will use the train packet header for the train packet and the control header of each payload block within the train packet to restore the original data packets from the train packet. As stated, the information in those headers will identify the boundaries between data packets within the train packet payload. Once the data packets have been restored, each data packet is outputted via the output port 133.

Figure 13A:
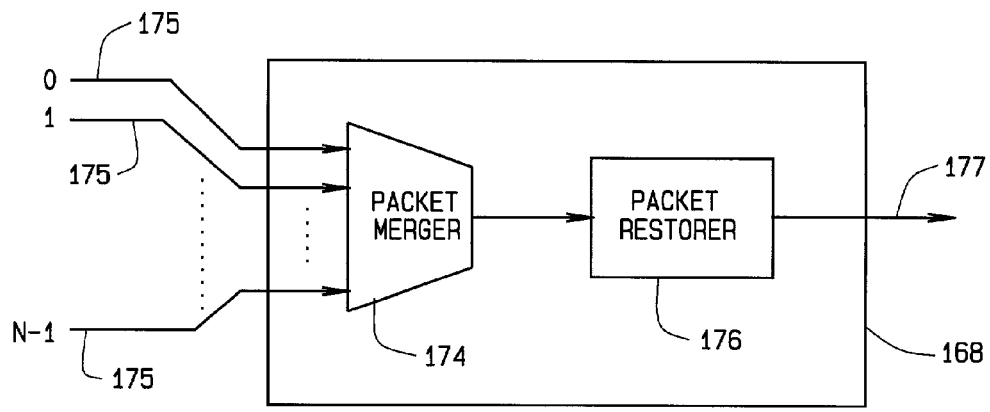
FIG. 13(a) is a block diagram of the packet deformatter used in sequential to parallel train packet processing.

FIG. 13(*a*) is a block diagram of a packet deformatter that is preferably used in conjunction with sequential to parallel train packet processing. Packet deformatter 168 is comprised of N input ports 175, a packet merger 174 linked to each of the N input ports 175, a packet restorer 176 linked to the packet merger 174, and an output port 177 linked to the packet restorer 176. Together, the packet merger and packet restorer function as a deformatting unit. The packet merger 174 receives subtrain packets from the switch planes in parallel. The basic function of the packet merger is to reassemble the train packet from which a full set of subtrain packets was sliced.

If the switch planes to which the deformatter 168 is linked are configured to be synchronous with each other, each subtrain packet within a set of subtrain packets will arrive essentially simultaneously in parallel to the packet merger. The subtrain packets belonging to the set of subtrain packets can then be easily reassembled to form the train packet. However, if the switch planes are configured to be asynchronous, the subtrain packets belonging to the same set of subtrain packets may arrive at the packet merger at different times. In such cases, the packet merger will have to wait until a full set of subtrain packets is received before reassembling the train packet from which that set of subtrain packets was sliced. Therefore, additional buffers will be needed in the packet merger to queue the subtrain packets while waiting for a full set of subtrain packets to arrive.

Figure 13B:
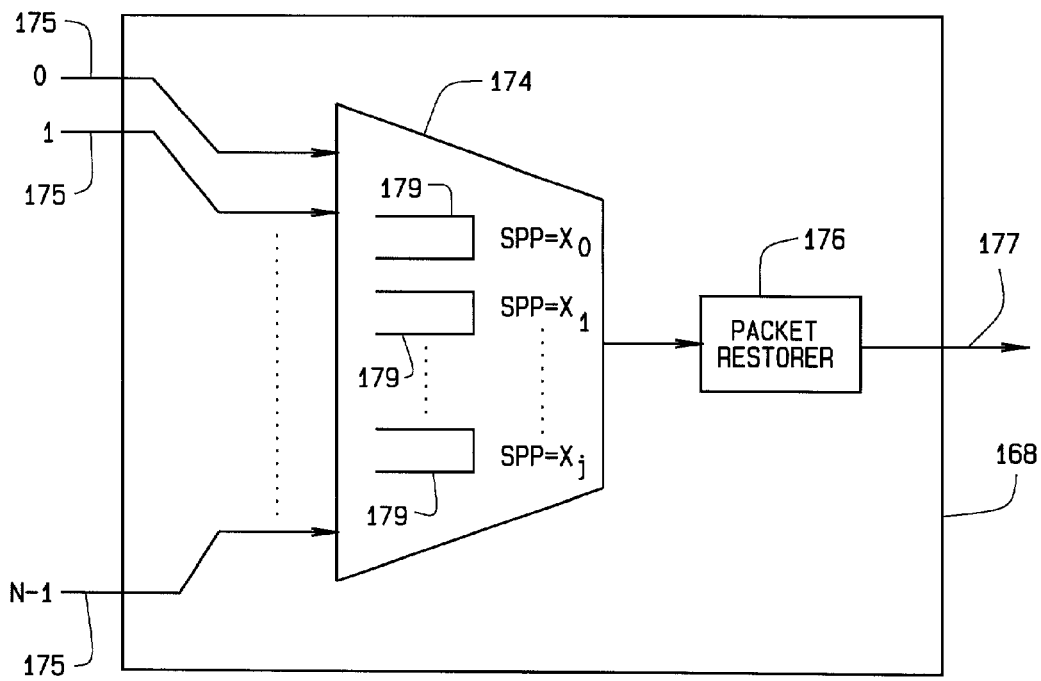
FIG. 13(b) is a block diagram of the packet deformatter used in sequential to parallel train packet processing when the switch fabric is asynchronous.

FIG. 13(b) shows the deformatter 168 for the asynchronous case where the packet merger has a plurality of merger buffers 179. Each merger buffer 179 will correspond to an SPP. Arriving subtrain packets will then be queued into the merger buffers according to their SPPs. Once a full set of subtrain packets is received by the packet merger, the train packet from which that set was sliced can be reassembled in the proper sequence using the subtrain header that is preferably attached to each subtrain packet.

Once the train packet is reassembled, the packet merger 174 will provide the reassembled train packet to the packet restorer 176. Packet restorer 176 will then operate as described above to extract each individual data packet from the reassembled train packet, according to the control header of each payload block and train header.

When the switch planes are configured to be synchronous with each other, a benefit is obtained in that each subtrain packet within a set of subtrain packets will arrive at the deformatter at the same time. However, to keep the switch planes synchronized, extra signals will have to be added among the switch planes. However, the packet merger used with asynchronous switch planes will need a larger buffer to queue subtrain packets while waiting for a full set of subtrain packets before reassembling the train packet. Therefore, practitioners of the present invention can configure the switch described herein with either a synchronous or asynchronous switch fabric depending upon their design preferences.

Figure 14:
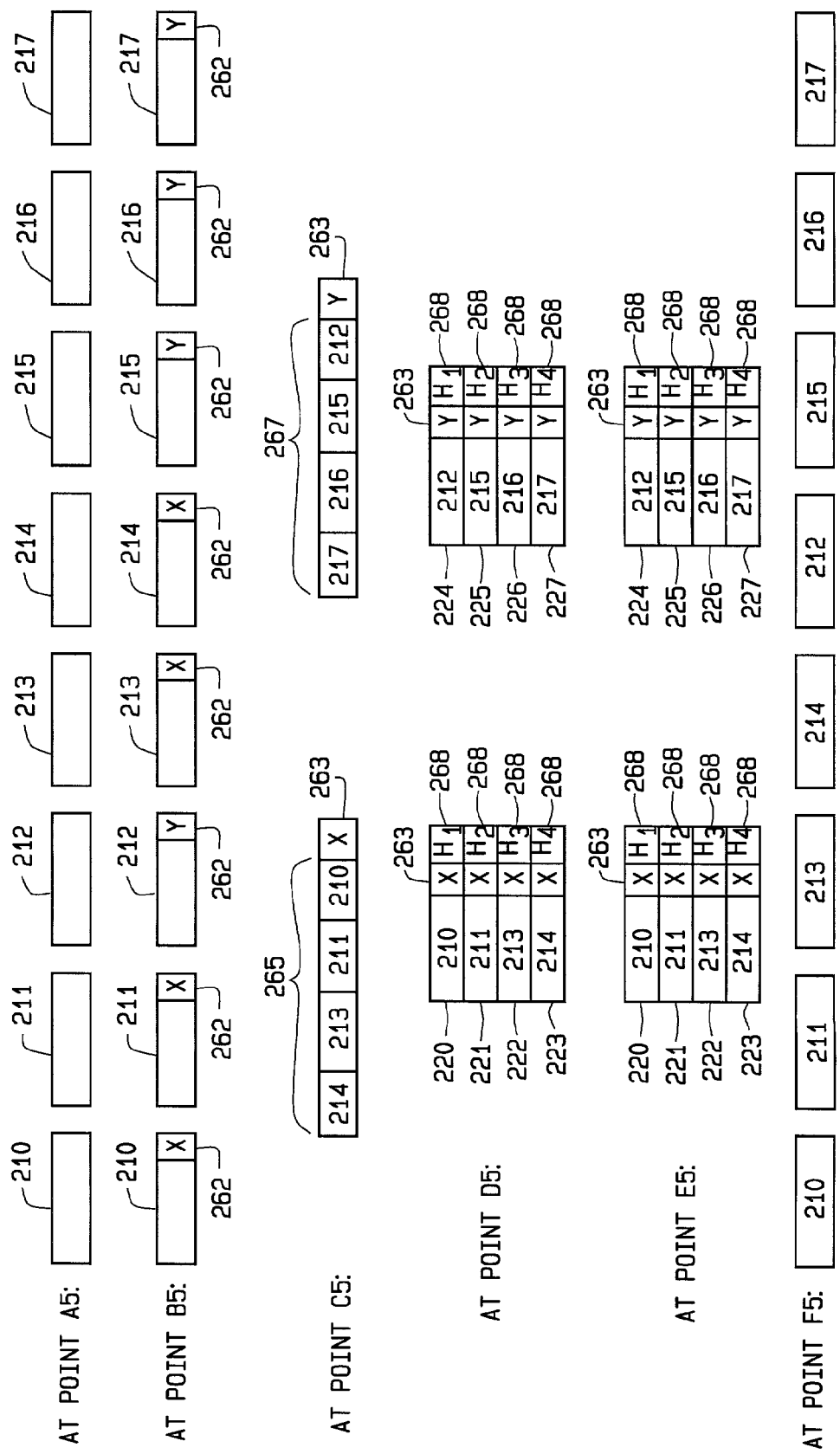
FIG. 14 illustrates data traffic at various points within the switch depicted in FIG. 5.

FIG. 14 depicts an example of traffic flow across a switch of employing sequential to parallel train packet processing where the incoming data packets have a fixed length. In FIG. 14, as one moves further to the right, time increases, so that a data packet at the indicated points will arrive after the packet to its left. Prior to reaching the SPP mappers (at point A5 which is shown in FIG. 6), the incoming data packets 210–217 will appear as shown. Once these incoming data packets are processed by the SPP mapper, the SPP mapper will attach an SPP portion 262 to them (as previously described). Preferably, the SPP portion 262 is attached to the beginning of the packet, but this is not necessary. FIG. 14 illustrates data packets 210–217 that have been stamped with an SPP 262 as they would appear at point B5 (point B5 is shown in FIG. 6). The data packets and their corresponding SPPs will be received by a packet formatter as shown at point B5. Buffers within the packet formatter will have space for packets sharing the same corresponding SPP. In this example, it can be seen that packets 210, 211, 213, and 214 have an SPP of "X". Those data packets will be queued within a buffer for SPPs of "X". Also, it can be seen that data packets 212, 215, 216, and 217 have an SPP of "Y". Those data packets will be queued within a buffer for SPPs of "Y". The algorithm of FIG. 10 will run, and the data packets will be converted into a train packet. In this example, we will assume both MaxPL and MinPL equal (four* packet length), and the train packet has four fixed size payload blocks configured such that each payload block can encapsulate one data packet. Thus, once four data packets arrive within the waiting buffer, those data packets will be encapsulated in the four payload blocks, one data packet per payload block (assuming the time constraints do not dictate otherwise).

FIG. 14 illustrates the train packets 265 and 267 as they would appear upon exit from the packet queuer (which is shown as point C5 in FIG. 8(a)). An SPP 262 that corresponds to the data packets making up the train packet will be carried in the train headers 263.

Train packet 265 is comprised of data packets 210, 211, 213, and 214. The SPP 262 of "X" corresponds to those data packets and is encapsulated in the train packet header 263. Train packet 267 is comprised of data packets 212, 215, 216, and 217. The SPP 262 of "Y" corresponds to those data packets and is encapsulated in the train packet header 263.

Next, train packets 265 and 267 are fed into the slicing unit. In this example, it can be seen that the slicing unit has a slicing number (N) of four. The sets of subtrain packets 220–227 created from each train packet can be seen in FIG. 14 as they would appear at point D5 (shown in FIG. 6) upon exit from the slicing unit. It can be seen that the payloads of train packets 265 and 267 have been sliced into two sets of 4 subtrain packet payloads. In this example, the slicing boundaries are such that each subtrain packet payload is the same length as a payload block. However, such matching is not necessary, and each subtrain packet payload may contain one or more payload blocks, a portion of a payload block, or some combination thereof. Attached to each subtrain packet payload is a subtrain header 268 which encapsulates the train packet header 263 of the train packet from which the subtrain packet was sliced and, if necessary, slicing information H for the subtrain packet set. The slicing information can be used during deformatting to reassemble the train packet payload in a proper sequence of payload blocks. Each of these sets of subtrain packets are sent in parallel across the switch fabric and are received by a deformatter. The switch fabric reads the SPP 262 and routes the subtrain packet to an appropriate switch output port on the basis of its SPP. FIG. 14 shows the data traffic at point E5 (shown in FIG. 6) as the subtrain packets are received by the deformatter.

Once received by the deformatter, the subtrain packets will be sequenced to reassemble the train packets from which the set of subtrain packets was sliced. At this point, data traffic should appear substantially the same as it appeared at point C5. Also, the packet merger preferably retains the train packet header portion of the subtrain header while removing the portions of the subtrain header not pertaining to the train packet header. Thereafter, the packet restorer will extract each individual data packet from within train packets 265 and 267 to restore data packets 210–217, as shown in FIG. 14 at point F5 (which is shown in FIG. 6).

As previously discussed, the choice of values for the formatter variables will affect the delay experienced by data packets as they pass through the switch of the present invention, as well as the amount of bandwidth that is wasted. For some types of data traffic (i.e., e-mail, ftp, web browsing), longer delays can be tolerated. However, for other types of data traffic (i.e., VOIP or other low rate real time traffic), long delays can cause distortion on the receiving end of the data. Therefore, for data traffic that is delay sensitive, it is desirable to use smaller values of MinL and Timer1. As previously discussed, the smaller values will result in less delay caused by data packets waiting within the formatter queues. However, for data traffic that is not delay sensitive, it is desirable to use larger values for MaxL, MinL, Timer1, and Timer2. The larger values for these parameters will result in longer train packets or subtrain packets, which means that fewer SPPs will have to processed as the train packets or subtrain packets are processed by the switch fabric. A practitioner of the present invention may find it desirable to set different values of the formatter variables for each waiting buffer according to the QoS characteristics, especially for MinL and Timer1. For the real-time traffic, one should be careful not to set MinL and Timer1 so high that the delay experienced within the packet formatter will outweigh the advantages provided by fewer switch SPP processings. The exact values for the variables for each waiting buffer should be set according to the QoS constraints, loading factor, and rate of traffic experienced by particular switches.

When the formatter variables are set to create longer train packets or subtrain packets, the longer the queuing delay that will be experienced by data packets. For a high rate connection, it will usually take a very short time to buffer the several data packets needed to form a long train packet. But for low rate connections, especially for a low rate real time connection, such as 64K voice data, if one wants to use train queuing processing, either a significant delay will be experienced or lots of bandwidth will be wasted transferring padding bytes. Therefore, it is desirable to provide differentiated service to different types of traffic.

Figure 15A:
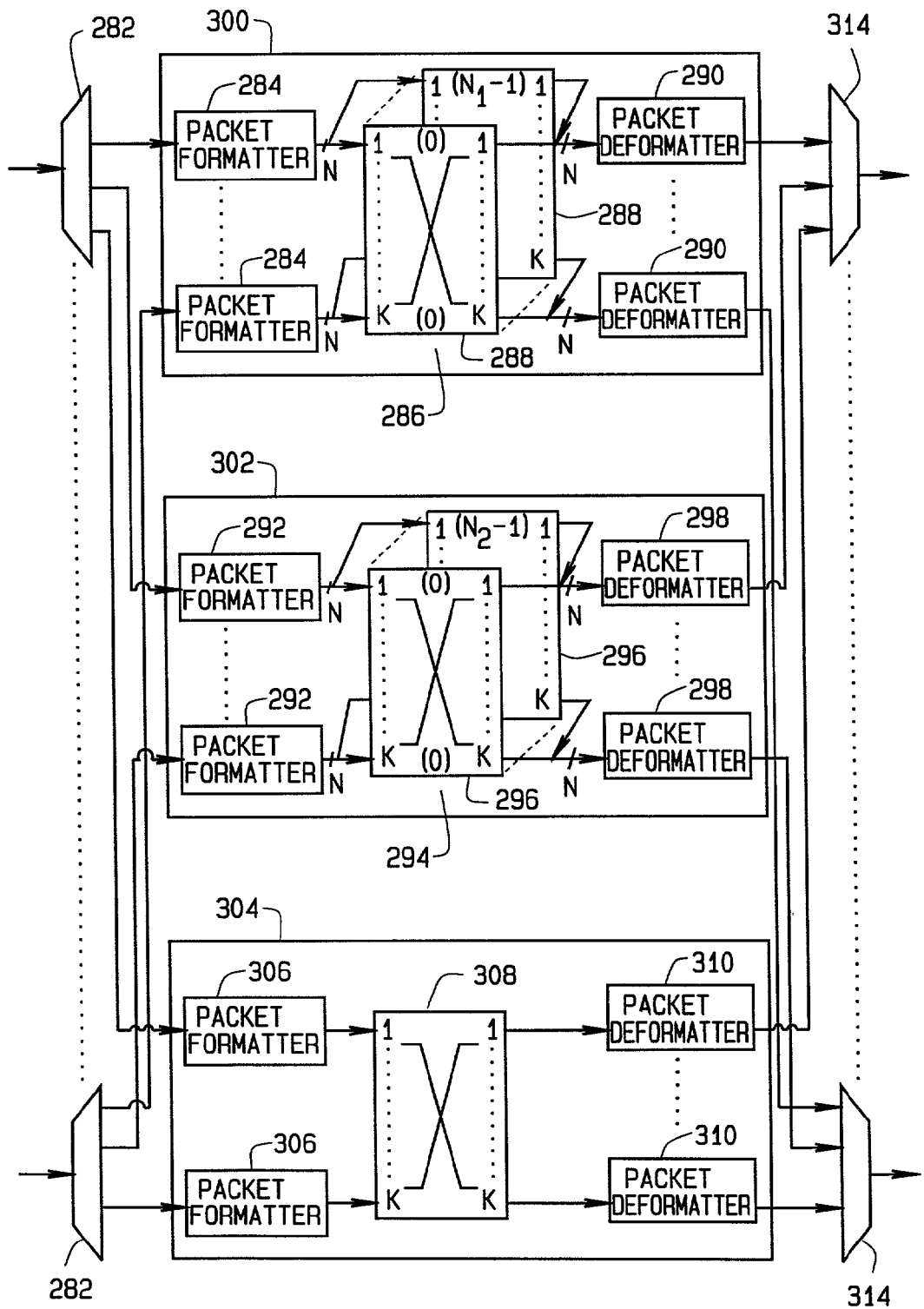
FIG. 15(a) depicts an embodiment of the present invention employing cocktail train packet processing.
Figure 15B:
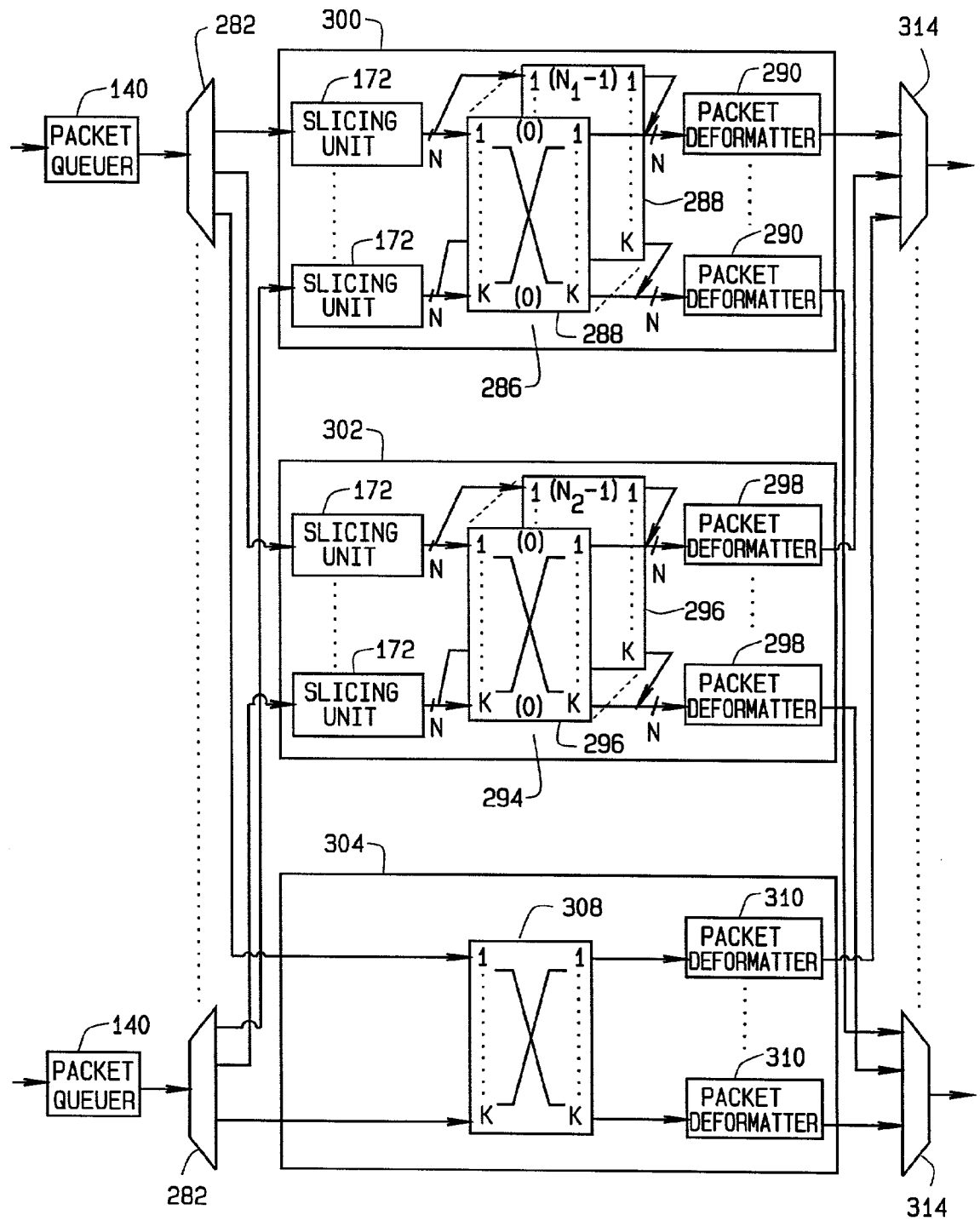
FIG. 15(b) depicts a second embodiment of the present invention employing cocktail train packet processing.

In order to provide differentiated service to delay sensitive and delay insensitive traffic, the multi-path switching systems of FIGS. 15(*a*) and 15(*b*) are provided. In this cocktail architecture, traffic distributors are used to sort and separate incoming data packets into a plurality of distribution classes on the basis of a predetermined set of distribution criteria. The data packets belonging to the same distribution class can then be distributed to a switch path corresponding to that distribution class.

A traffic distributor sorts the incoming data packets into distribution classes on the basis of a predetermined set of distribution criteria, such as traffic classes, rate, delay bound, multicast, unicast, etc. Delay sensitive traffic can be placed into a switch path that uses a switch employing the present invention (either sequential train packet processing or sequential to parallel train packet processing) with formatter variables set such that little queuing delay will be experienced in the formatters. Delay insensitive traffic can be placed into a switch path that uses the a switch employing the present invention (either sequential train packet processing or sequential to parallel train packet processing) with formatter variables set such that higher queuing delay may be experienced in the formatters.

In addition to sorting incoming packets on the basis of various QoS constraints, the distribution criteria can be chosen such that traffic will be sorted into different switch paths having different formatter characteristics. If these QoS constraints are incorporated into the SPP value, the traffic distributor can separate traffic based on SPPs. Otherwise, the traffic distributor has to separate the data packets based its SPP and QoS constraints.

In FIG. 15(*a*), one embodiment of the cocktail architecture of the present invention is disclosed. Preferably, at least one of the switch paths employs either sequential train packet processing or sequential to parallel train packet processing. In this example, the multi-path switching system is comprised of three switch paths 300, 302, and 304. However, it is easily understood that more or fewer switch paths can be provided. The number of switch paths would depend upon how many distribution criteria a practitioner of the present invention wished to provide. In path 300, traffic is passed through formatters 284 to switch fabric 286, then on to deformatters 290. In path 302, traffic is passed through formatters 292 to switch fabric 294, and on to deformatters 298. As can be seen, paths 300 and 302 are both comprised of switches employing sequential to parallel train packet processing. In path 304, which employs sequential train packet processing, traffic is passed through formatters 306 to switch fabric 308 and on to deformatters 310. Each path employing sequential to parallel train packet processing may use a different slicing number. In path 300, $N=N_1$, as evidenced by the number of switch planes 288. In path 302, $N=N_2$, as evidenced by the number of switch planes 296.

It must be noted that not all paths need to necessarily employ sequential or sequential to parallel train packet processing because it may be desirable for one or more of the paths to employ conventional switching if the amount of traffic in that path is such that a bottleneck does not exist.

Figure 16:
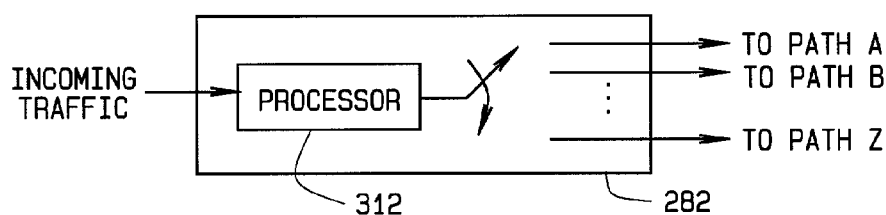
FIG. 16 is a block diagram of the traffic distributor used to separate incoming data packets on the basis of a predetermined set of distribution criteria.

Incoming data packets and their corresponding SPPs (which may be determined by an SPP mapper(not shown)) are passed through the traffic distributors 282. Preferably, there will be K traffic distributors (one for each switch input port). Each traffic distributor will separate the data packets into a particular path on the basis of a predetermined set of distribution criteria. FIG. 16 depicts the traffic distributor 282. As can be seen, incoming data packets are handled by a processor 312 which sorts the incoming data packets using various distribution criteria. Thereafter, the processor places the data packets onto an output line in accordance with those criteria. The distribution criteria can be virtually any QoS factor such as traffic class, destination address, source address, priority, traffic rate, etc.

After the data packets have been placed in appropriate paths, the data packets will be processed by the switch fabrics employed in that path as previously described. The delay within each path can be controlled using the packet formatter variables. After the packets have been processed by the formatters, switches, and deformatters within each path, the packets are passed through traffic mergers 314. Preferably, there will be K traffic mergers 314 (the same as the number of distributors). Each traffic merger will receive in parallel the data packets sent from each path and output those data packets in series.

FIG. 15(*b*) discloses a second embodiment of the cocktail architecture of the present invention. In this embodiment, the architecture is similar to that of FIG. 15(*a*) except that a packet queuer 140 is placed upstream from the traffic distributor. In switch paths employing sequential to parallel train packet processing, a slicing unit 172 is placed between the traffic distributor and the switch input ports. In switch paths employing sequential train packet processing, the distributor outputs are linked directly to the switch input ports. In this embodiment, the traffic distributors will sort train packets according to distribution criteria, rather than sort each data packet individually.

Figure 17A:
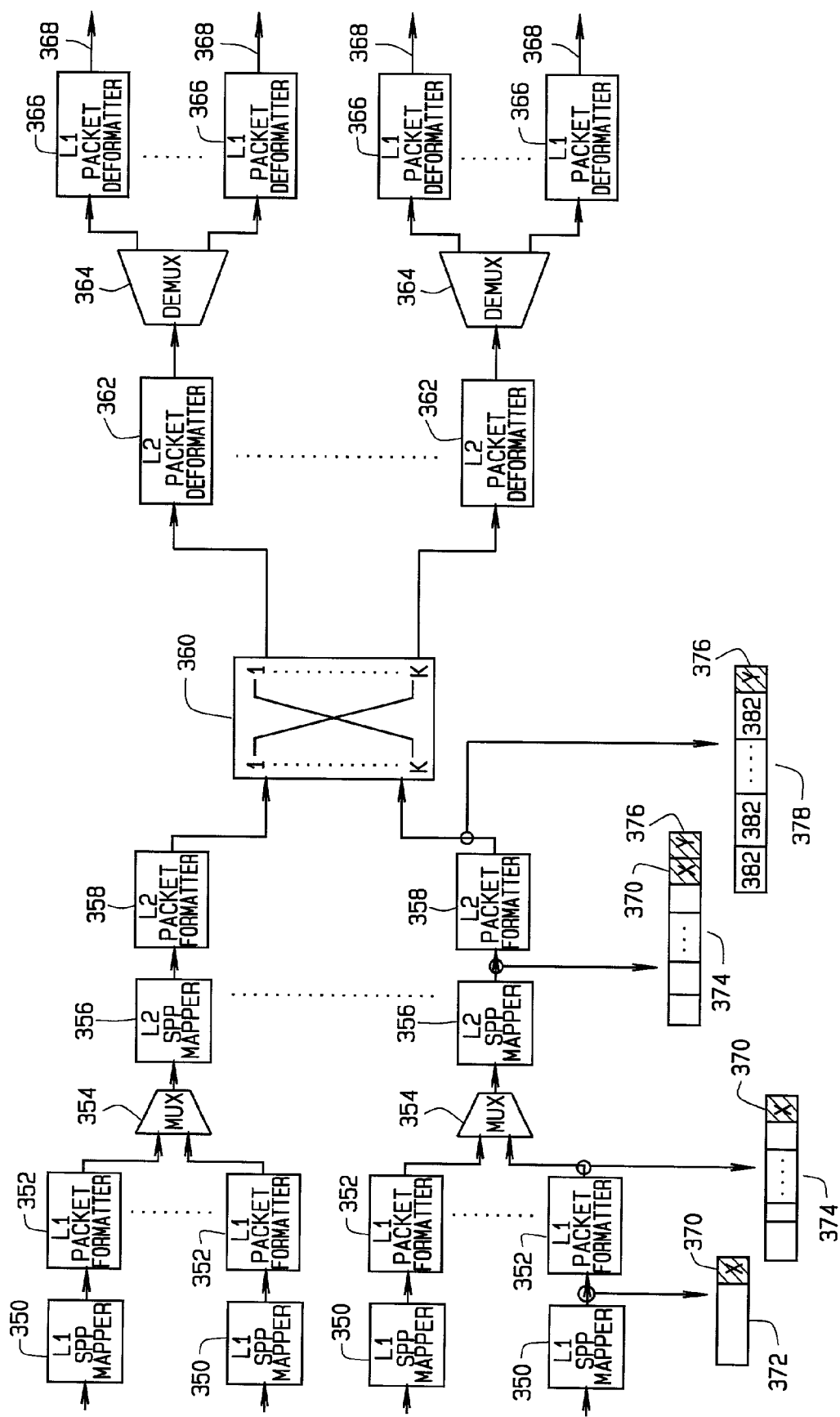
FIG. 17(a) depicts an embodiment of the present invention employing hierarchical train packet processing.

FIGS. 17(*a*) and 17(*b*) depict yet another embodiment of the present invention, hierarchical train packet processing. In hierarchical train packet processing, there are at least two formatting levels, with FIGS. 17(*a*) and 17(*b*) depicting an example where there are in fact two formatting levels. It should be apparent however, that hierarchical train packet processing can encompass more than two formatting stages by multiplexing additional links to a previous stage. Hierarchical train packet processing can be used in multi-stage (or multi-level) switch fabrics wherein the data packets need a different SPP for each stage/level.

FIG. 17(*a*) depicts an example of hierarchical train packet processing wherein sequential train packet processing is employed by the second level packet formatters. Prior to entering the first level packet formatters 352, the data packets will be passed through a first level SPP mapper 350. The first level SPP mappers 350 identify an output link 368 for which the data packet is destined and encapsulate an appropriate first level SPP 370 into that data packet 372. Next, the data packets will arrive at a first level packet formatter 352. The first level packet formatters 352 will create first level train packets 374 from data packets 372 on the basis of the first level SPPs as previously described with respect to sequential train packet processing. Encapsulated within each first level train packet header will be the first level SPP 370 for that first level train packet.

The first level train packets outputted from a plurality of first level packet formatters will then be multiplexed onto a single line by a multiplexor 354. The multiplexed first level train packets will then be passed to a second level SPP mapper 356. The second level SPP mapper will identify a destination output port (1 through K) of the switch fabric 360 for each incoming first level train packet, and encapsulate an appropriate second level SPP 376 therein.

Next, the second level packet formatters 358 will receive the first level train packets 374 having a second level SPP 376 encapsulated therein. Each second level packet formatter will create second level train packets 378 from the first level train packets 374 on the basis of the second level SPPs encapsulated in the first level train packets. The creation of second level train packets will proceed as described above with respect to sequential to parallel train packet processing, with the exception that the payload blocks 382 of the second level train packet 378 will be filled with first level train packets (or portions thereof). The common second level SPP 380 of the second level train packet's constituent first level train packets will be encapsulated in the train header of the second level train packet.

The second level train packets will be outputted from the second level packet formatters and provided to the switch fabric 360 which will route each second level train packet according to its second level SPP. After being routed by the switch fabric, the second level train packets will be sent to a second level packet deformatter 362. The second level deformatter will extract each individual first level train packet from the payload of the second level train packet, as described above with respect to sequential train packet processing. The output of each second level packet deformatter 362 will therefore be a stream of first level train packets. This stream of first level train packets will be demuitiplexed to a plurality of lines by a demultiplexor 364. The first level train packets will be demultiplexed to a particualar demultiplexor output according to the first level SPP encapsulated in the train header of each first level train packet.

Connected to each output link of a demultiplexor 364 will be a first level packet deformatter 366. Each first level packet deformatter will extract the individual data packets from within the payloads of the first level train packets, as described above with respect to sequential train packet processing. Once each data packet has been restored, the restored data packets will be outputted on the output links 168.

Figure 17B:
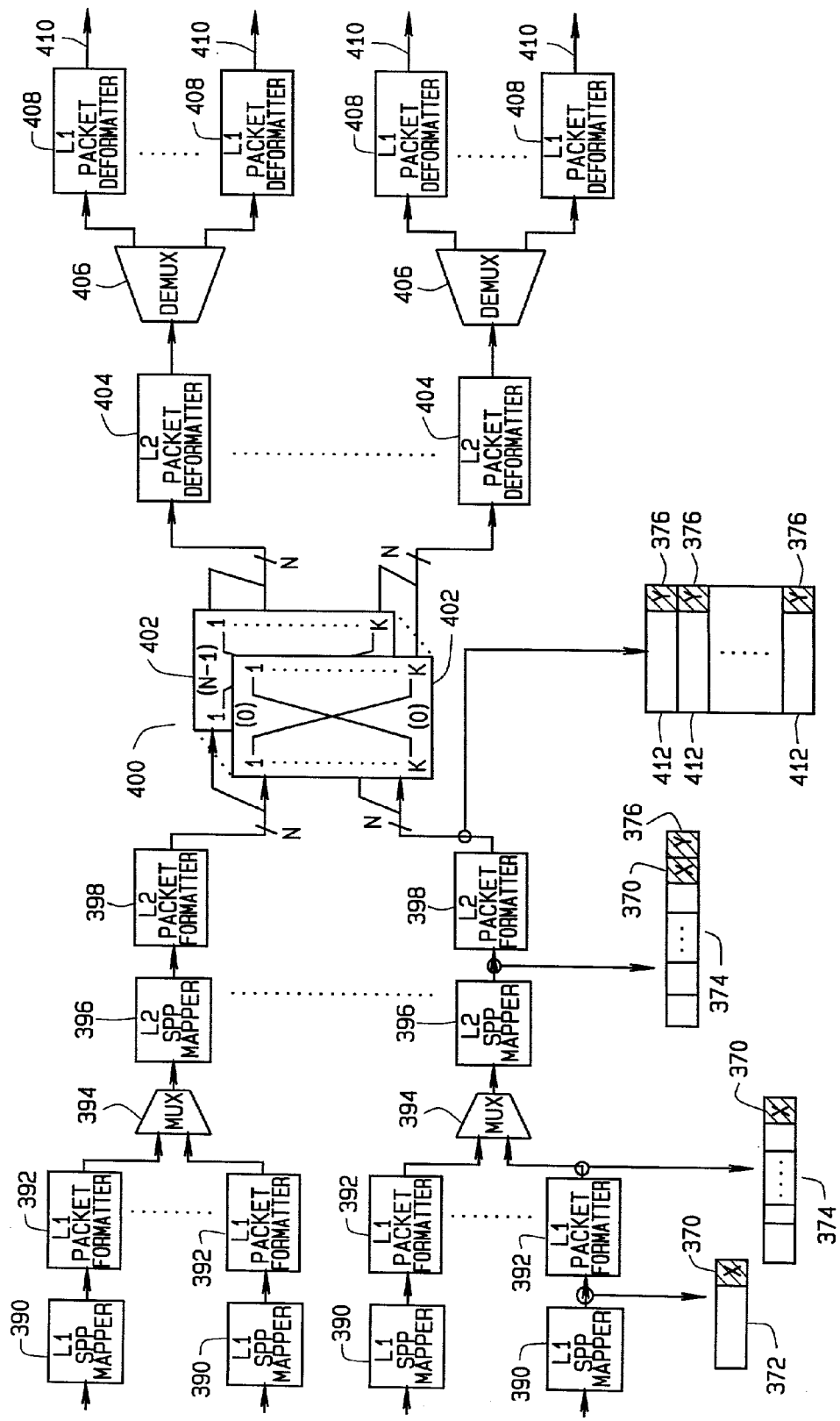
FIG. 17(b) depicts a second embodiment of the present invention employing hierarchical train packet processing.

FIG. 17(b) shows an example of hierarchical train packet processing wherein sequential to parallel train packet processing is employed immediately prior and immediately subsequent to the switch fabric. In the example of FIG. 17(b), first level SPP mappers 390, first level packet formatters 392, multiplexors 394, and second level SPP mappers 396 operate as described above in the example of FIG. 17(a). However, at the second level, packet formatters 398 employing sequential to parallel train packet processing are used. Each second level packet formatter creates a set of N subtrain packets 412. The set of N subtrain packets will be as described above with respect to sequential to parallel train packet processing except that the payloads of the subtrain packets will encapsulate first level train packets. Also, the second level SPP 376 common to each first level train packet encompassed in the subtrain headers. The set of subtrain packets will be passed in parallel to a stacked switch fabric 400 having N switch planes 402. Second level deformatters 404 will employ sequential to parallel train packet processing to receive the subtrain packets coming from the switch planes and extract each first level train packet from the payloads of the set of subtrain packets (as described above in connection with sequential to parallel train packet processing). Then, the demultiplexors 406 and first level packet deformatters 408 will operate as described in the example of FIG. 17(a), and the restored data packets will be outputted on lines 410.

It is easily understood that one having ordinary skill in the art would recognize many modifications and variations within the spirit of the invention that may be made to the particular embodiments described herein. Therefore, the scope of the invention is not intended to be limited solely to the particular embodiments described herein, which are intended to be illustrative. Instead, the scope of the invention should be determined by reference to the claims below in view of the specification and figures, together with the full scope of equivalents allowed under applicable law.

What is claimed is:

1. A switch for routing data packets between a plurality of switch inputs and a plurality of switch outputs, said switch comprising:
  a) a plurality of first level SPP mappers for determining a corresponding first level SPP for each data packet and attaching said determined first level SPP thereto;
  b) a plurality of first level packet formatters for queuing together data packets sharing a common corresponding first level SPP, creating first level train packets from the commonly-queued data packets, wherein each first level train packet comprises a payload and a header, wherein the payload of at least one first level train packet includes a plurality of commonly-queued data packets, and wherein the header of each first level train packet includes the common first level SPP corresponding to each data packet included in the payload of that first level train packet;
  c) a plurality of second level SPP mappers for determining a corresponding second level SPP for each first level train packet and attaching said determined second level SPP thereto;
  d) a plurality of second level packet formatters for queuing together first level train packets sharing a common corresponding second level SPP, creating second level train packets from the commonly-queued data packets, wherein each second level train packet comprises a payload and a header, wherein the payload of at least one second level train packet includes a plurality of commonly-queued first level train packets, and wherein the header of each second level train packet includes the common second level SPP corresponding to each first level train packet included in the payload of that second level train packet;
  e) a plurality of multiplexors, each multiplexor linking a plurality of first level packet formatters to a second level packet formatter;
  f) a switch fabric having a plurality of switch fabric inputs for receiving second level train packets from the second level packet formatters and a plurality of switch fabric outputs for outputting routed second level train packets, wherein the switch fabric is configured to route each received second level train packet to a switch fabric output according to the second level SPP included in the header of each second level train packet;

g) a plurality of second level packet deformatters for receiving routed second level train packets outputted from the switch fabric, extracting first level train packets from the payloads of the received routed second level train packets, and outputting the extracted first level train packets;

h) a plurality of first level packet deformatters for receiving extracted first level train packets outputted from the second level packet deformatters, extracting data packets from the payloads of the received extracted first level train packets, and outputting the extracted data packets; and i) a plurality of demultiplexors, each demultiplexor linking a second level packet deformatter with a plurality of first level packet deformatters.

2. A switch for routing data packets between a plurality of switch inputs and a plurality of switch outputs, said switch comprising:

a) a plurality of first level SPP mappers for determining a corresponding first level SPP for each data packet and attaching said determined first level SPP thereto;

b) a plurality of first level packet formatters for queuing together data packets sharing a common corresponding first level SPP, creating first level train packets from the commonly-queued data packets, wherein each first level train packet comprises a payload and a header, wherein the payload of at least one first level train packet includes a plurality of commonly-queued data packets, and wherein the header of each first level train packet includes the common first level SPP corresponding to each data packet included in the payload of that first level train packet;

c) a plurality of second level SPP mappers for determining a corresponding second level SPP for each first level train packet and attaching said determined second level SPP thereto;

d) a plurality of second level packet formatters, each of said second level packet formatters configured to (1) queue first level train packets according to their corresponding second level SPPs such that first level train packets sharing a common corresponding second level SPP are commonly-queued, (2) create subtrain packet sets from the commonly-queued first level train packets, each subtrain packet set comprising a plurality N of subtrain packets, each subtrain packet comprising a subtrain payload and a subtrain header, wherein the subtrain payloads of the subtrain packets in at least one subtrain packet set encapsulate a plurality of commonly-queued first level train packets in the aggregate, and wherein the subtrain header of each subtrain packet in each subtrain packet set includes the second level SPP shared by each first level train packet encapsulated in the aggregated subtrain payload of that subtrain packet set, and (3) for each subtrain packet set, outputting the subtrain packets included in that subtrain packet set in parallel;

e) a plurality of multiplexors, each multiplexor linking a plurality of first level packet formatters to a second level packet formatter;

f) a switch fabric for routing subtrain packet sets received from the second level packet formatters, said switch fabric comprising a plurality N of switch planes, each switch plane having a plurality of switch plane inputs for receiving subtrain packets from the second level packet formatters and a plurality of switch plane outputs for outputting subtrain packets, wherein each switch plane is configured to (1) receive a subtrain packet from each subtrain packet set, and (2) route each received subtrain packet to a switch plane output according to the second level SPP included in its subtrain header; and g) a plurality of second level packet deformatters, each second level packet deformatter configured to (1) receive routed subtrain packet sets from the switch fabric, (2) extract from the received subtrain packet sets the first level train packets encapsulated therein, and (3) output each extracted first level train packet;

h) a plurality of first level packet deformatters for receiving extracted first level train packets outputted from the second level packet deformatters, extracting data packets from the payloads of the received extracted first level train packets, and outputting the extracted data packets; and i) a plurality of demultiplexors, each demultiplexor linking a second level packet deformatter with a plurality of first level packet deformatters.

3. A packet switch for processing a plurality of data packets, each data packet comprising a payload portion and a header portion, each data packet having a switch processing parameter (SPP) associated therewith, the packet switch comprising:

a plurality of packet formatters within the packet switch; and a switch fabric within the packet switch, the switch fabric in communication with the packet formatters;

wherein the switch fabric comprises a plurality of switch fabric input ports and a plurality of switch fabric output ports;

wherein the packet formatters are configured perform sequential train packet processing on a plurality of received data packets and their associated SPPs to thereby generate a plurality of train packets for receipt by the switch fabric input ports, each generated train packet having an associated SPP; and wherein the switch fabric is configured to receive the generated train packets and switch each received generated train packet from a switch fabric input port to a switch fabric output port according to its associated SPP; and wherein each packet formatter comprises a plurality of buffers for queuing data packets according to their associated SPPs such that any data packet that is queued in a buffer shares a common associated SPP with each other data packet that is also queued in that buffer, and wherein the packet formatter is further configured to maintain a plurality of parameters that govern train packet generation from any data packets that are queued in the buffers, the plurality of parameters comprising a maximum train packet length, a minimum train packet length, a maximum amount of time that a data packet may be queued in a buffer for a train packet that is created from that buffer, and a minimum amount of time that a data packet will be queued in a buffer before the packet formatter creates a train packet having padding, wherein the maximum amount of time is greater than the minimum amount of time.

4. The packet switch of claim 3 wherein each train packet has a payload portion, at least a plurality of the payload portions of the train packets encapsulating both at least one data packet payload portion and at least one data packet header portion.

5. The packet switch of claim 3 wherein the parameters are defined for each buffer independently of the other buffers.

6. The packet switch of claim 3 wherein at least one packet formatter is further configured to, if a queual of an arriving data packet in a buffer, the buffer having a content of at least one data packet that is already queued therein, would cause an aggregate length of data packets queued in that buffer to exceed that buffer's maximum train packet length, create a train packet from that buffer's content but not the arriving data packet, wherein the created train packet includes padding if an aggregate length of the buffer's content does not equal or exceed that buffer's minimum train packet length, and wherein the at least one packet formatter is further configured to queue the arriving train packet in a buffer for a subsequent transformation into a train packet.

7. The packet switch of claim 3 wherein at least one packet formatter is further configured to, if a queuing of an arriving data packet in a buffer, the buffer having a content of at least one data packet that is already queued therein, would cause an aggregate length of data packets queued in that buffer to exceed that buffer's maximum train packet length, create a train packet from that buffer's content and a portion of the arriving packet sufficient to cause the created train packet to have a length equal to the maximum train packet length, and wherein the at least one packet formatter is further configured to queue a remainder portion of the arriving train packet in a buffer for a subsequent transformation into a train packet.

8. The packet switch of claim 3 further comprising a plurality of SPP mappers in communication with the packet formatters, each SPP mapper being configured to determine the SPP associated with each data packet, each SPP comprising an identification of a switch fabric output port.

9. The packet switch of claim 8 wherein each SPP further comprises a priority for its associated data packet.

* * * * *